United States Patent
Ni

(10) Patent No.: US 10,407,148 B2
(45) Date of Patent: Sep. 10, 2019

(54) METHOD AND DEVICE FOR CONTROLLING ENERGY-SAVING SAILING OF SHIP

(71) Applicant: Jiefeng Ni, Changshu (CN)

(72) Inventor: Jiefeng Ni, Changshu (CN)

(*) Notice: Subject to any disclaimer, the term of this patent is extended or adjusted under 35 U.S.C. 154(b) by 124 days.

(21) Appl. No.: 15/523,401

(22) PCT Filed: Jan. 26, 2015

(86) PCT No.: PCT/CN2015/071552
§ 371 (c)(1),
(2) Date: Apr. 30, 2017

(87) PCT Pub. No.: WO2016/090737
PCT Pub. Date: Jun. 16, 2016

(65) Prior Publication Data
US 2017/0313397 A1    Nov. 2, 2017

(30) Foreign Application Priority Data
Dec. 9, 2014 (CN) .......................... 2014 1 0745566

(51) Int. Cl.
*B63H 21/21* (2006.01)
*B63H 21/38* (2006.01)
(Continued)

(52) U.S. Cl.
CPC .............. *B63H 21/21* (2013.01); *B63H 21/38* (2013.01); *B63H 21/386* (2013.01);
(Continued)

(58) Field of Classification Search
CPC .............. B63H 21/21; B63H 2021/216; B63H 21/386; F02D 41/0002; F02D 41/021
See application file for complete search history.

(56) References Cited

U.S. PATENT DOCUMENTS 4,459,671 A    7/1984 Teass et al.
8,801,477 B2   8/2014 Kuriyagawa et al.

FOREIGN PATENT DOCUMENTS

CN    101353984 A  *  1/2009  ............ B60W 30/18
CN    101353984 A     1/2009
(Continued)

OTHER PUBLICATIONS

CN 102768524—English Translation (Year: 2012).*
CN 101353984—English Translation (Year: 2009).*
CN 101520467—English Translation (Year: 2009).*

*Primary Examiner* — Anne M Antonucci
*Assistant Examiner* — Renee LaRose
(74) *Attorney, Agent, or Firm* — Cheng-Ju Chiang

(57) ABSTRACT

The present invention discloses a method and device for controlling energy-saving sailing of a ship. The method comprises the steps of changing the operating parameters of the ship correspondingly when the resistance of the ship changes during routine sailing, controlling the current opening degree of a throttle to increase the instantaneous oil supply amount of a main engine of the ship if the resistance of the ship becomes smaller, and controlling the current opening degree of the throttle to reduce the instantaneous oil supply amount of the main engine of the ship if the resistance of the ship becomes larger. Compared with the prior art, the method and device have the advantages that energy waste is reduced greatly and the sailing cost is reduced.

16 Claims, 6 Drawing Sheets

(51) Int. Cl.
*F02D 41/02* (2006.01)
*F02D 41/00* (2006.01)
*B63J 99/00* (2009.01)

(52) U.S. Cl.
CPC ....... *F02D 41/0002* (2013.01); *F02D 41/021* (2013.01); *B63H 2021/216* (2013.01); *B63J 2099/008* (2013.01); *F02D 2200/0625* (2013.01); *F02D 2200/501* (2013.01); *Y02T 10/42* (2013.01)

(56) References Cited

FOREIGN PATENT DOCUMENTS

| | | | |
|---|---|---|---|
| CN | 101462590 A | | 6/2009 |
| CN | 101520467 A | * | 9/2009 |
| CN | 101520467 A | | 9/2009 |
| CN | 202493345 U | | 10/2012 |
| CN | 102768524 A | * | 11/2012 |
| CN | 102768524 A | | 11/2012 |
| CN | 102811903 A | | 12/2012 |
| CN | 102953835 A | | 3/2013 |
| CN | 103185618 A | | 7/2013 |
| CN | 104090595 A | | 10/2014 |
| CN | 104590529 A | | 5/2015 |
| CN | 104595040 A | | 5/2015 |
| JP | H8-239093 A | | 9/1996 |
| JP | 2003-11892 A | | 1/2003 |
| KR | 10-2010-0073666 A | | 7/2010 |
| KR | 10-2014-0022943 A | | 2/2014 |

* cited by examiner

Configuring a preset instantaneous oil supply amount of a main engine of a ship

↓

Keeping the main engine of the ship to operate always below the preset instantaneous oil supply amount by controlling the current opening degree of a throttle during routine sailing

Fig. 3

Correspondingly changing the operating parameters of the ship when the resistance suffered by the ship during sailing changes, during route sailing Controlling the current opening degree of a throttle to increase the instantaneous oil supply amount of the main engine of the ship if the resistance suffered by the ship becomes smaller Controlling the current opening degree of the throttle to reduce the instantaneous oil supply amount of the main engine of the ship if the resistance suffered by the ship becomes larger

Fig. 4

METHOD AND DEVICE FOR CONTROLLING ENERGY-SAVING SAILING OF SHIP

CROSS REFERENCE

The present invention is a 35 U.S.C. § 371 National Phase conversion of International (PCT) Patent Application No. PCT/CN2015/071552, filed on Jan. 26, 2015, which claims the priority of the Chinese patent application No. 201410745566.7, entitled "Method and device for controlling energy-saving sailing of ship", filed on Dec. 9, 2014, the entirety of which is incorporated herein by reference. The PCT International Patent Application was filed and published in Chinese.

TECHNICAL FIELD

The present invention relates to the field of sailing technologies of ships, and in particular to a method and device for controlling energy-saving sailing of a ship.

BACKGROUND

As the Chinese and world economy develop, the amount of logistics is increasing, and the shipping market also will continue to grow and develop. For a shipping company, the fuel cost is a major cost of operating the company, so research on new ship fuel-saving technologies is very important to further save fuel consumption. Reducing the ship operating cost, saving energy and reducing emissions are very important for business development and the protection of the natural environment.

Oil is the main part of the ship sailing expenses. Therefore, saving fuel is a very important aspect to improve the ship. After saving oil, the ship's fuel consumption is reduced, and gas emissions and wastes will be reduced, which is of great significance to environmental protection. At the same time, after saving oil, the ship sailing costs will be reduced.

Existing ship energy-saving technologies mainly include ship design optimization. For example, more efficient driving devices and energy-saving ship shapes are used, and the performance of ship equipment is improved and the like.

Of course, the prior arts also include fuel-saving methods through sailing control, such as reducing the ship sailing speed, using a given rotational speed or a given power of the main engine for sailing and the like. However, regardless of which method is used, the main engine of the ship is controlled under a relatively fixed operating state, resulting in poor fuel-saving efficiency.

SUMMARY

One object of the present invention is to provide a method and device for controlling energy-saving sailing of a ship.

To achieve the above object of the present invention, an embodiment of the present invention provides a method for controlling energy-saving sailing of a ship, comprising: detecting a ship speed relative to the ground and a ship speed relative to water in real time during routine sailing; controlling the current opening degree of a throttle to increase the instantaneous oil supply amount of a main engine of the ship if the ship speed relative to the ground is larger than the ship speed relative to water and a difference therebetween is not less than a preset value; and controlling the current opening degree of the throttle to reduce the instantaneous oil supply amount of the main engine of the ship if the ship speed relative to the ground is smaller than the ship speed relative to water and the difference therebetween is not less than the preset value.

As an improvement of the embodiment of this invention, the method further comprises: if the ship speed relative to the ground is larger than the ship speed relative to water, gradually increasing the instantaneous oil supply amount of the main engine of the ship, calculating an oil consumption amount corresponding to a predetermined distance under each instantaneous oil supply amount in real time to identify the minimum instantaneous oil supply amount for the predetermined distance, and keeping sailing under the minimum instantaneous oil supply amount; if the ship speed relative to the ground is smaller than the ship speed relative to water, gradually reducing the instantaneous oil supply amount of the main engine of the ship, calculating an oil consumption amount corresponding to the predetermined distance under each instantaneous oil supply amount in real time to identify the minimum instantaneous oil supply amount for the predetermined distance, and keeping sailing under the minimum instantaneous oil supply amount; and repeating the above steps.

As another improvement of the embodiment of this invention, an upper limit value and a lower limit value of a rotational speed of the main engine are configured, such that the main engine is controlled to operate between the upper and lower limit values by controlling the opening degree of the throttle.

As yet another improvement of the embodiment of this invention, before detecting the ship speed relative to the ground and the ship speed relative to water in real time during routine sailing, the method further comprises: configuring a preset instantaneous oil supply amount; and keeping the main engine of the ship operating below the preset instantaneous oil supply amount by controlling the opening degree of the throttle during routine sailing, until the difference between the ship speed relative to the ground and the ship speed relative to water is not less than the preset value.

As yet another improvement of the embodiment of this invention, the method further comprises: gradually changing the instantaneous oil supply amount of the main engine of the ship, and calculating an oil consumption amount corresponding to the predetermined distance under each instantaneous oil supply amount; and calculating the minimum instantaneous oil supply amount corresponding to the predetermined distance, and taking the same as the preset instantaneous oil supply amount.

To achieve the above object of the present invention, another embodiment of the present invention provides a method for controlling energy-saving sailing of a ship, comprising: detecting a ship speed relative to the ground in real time; during routine sailing and under the same instantaneous oil supply amount, if the ship speed relative to the ground becomes larger and a change amount is not less than a preset value, controlling the current opening degree of a throttle to increase the instantaneous oil supply amount of a main engine of the ship; and if the ship speed relative to the ground becomes smaller and the change amount is not less than a preset value, controlling the current opening degree of the throttle to reduce the instantaneous oil supply amount of the main engine of the ship.

As an improvement of the embodiment of this invention, the method further comprises: if the ship speed relative to the ground becomes larger and the change amount is not less than a preset value, gradually increasing the instantaneous oil supply amount of the main engine of the ship, calculating an oil consumption amount corresponding to a predetermined distance under each instantaneous oil supply amount in real time to identify the minimum instantaneous oil supply amount for the predetermined distance, and keeping sailing under the minimum instantaneous oil supply amount; if the ship speed relative to the ground becomes smaller and the change amount is not less than a preset value, gradually reducing the instantaneous oil supply amount of the main engine of the ship, calculating an oil consumption amount corresponding to the predetermined distance under each instantaneous oil supply amount in real time to identify the minimum instantaneous oil supply amount for the predetermined distance, and keeping sailing under the minimum instantaneous oil supply amount; and repeating the above steps.

As another improvement of the embodiment of this invention, an upper limit value and a lower limit value of a rotational speed of the main engine are configured, such that the main engine is controlled to operate between the upper and lower limit values by controlling the opening degree of the throttle.

As yet another improvement of the embodiment of this invention, before detecting the ship speed relative to the ground in real time, the method further comprises: configuring a preset instantaneous oil supply amount; and keeping the main engine of the ship operating below the preset instantaneous oil supply amount by controlling the opening degree of the throttle during routine sailing, until the ship speed relative to the ground changes and the change amount is not less than the preset value.

As yet another improvement of the embodiment of this invention, the method further comprises: gradually changing the instantaneous oil supply amount of the main engine of the ship, and calculating an oil consumption amount corresponding to the predetermined distance under each instantaneous oil supply amount; and calculating the minimum instantaneous oil supply amount corresponding to the predetermined distance, and taking the same as the preset instantaneous oil supply amount.

To achieve the above object of the present invention, yet another embodiment of the present invention provides a method for controlling energy-saving sailing of a ship, comprising: when a resistance suffered by the ship changes during routine sailing and a change amount of the resistance is not less than a preset threshold value, changing the operating parameters of the ship; if the resistance suffered by the ship becomes smaller, controlling the current opening degree of a throttle to increase the instantaneous oil supply amount of a main engine of the ship; and if the resistance suffered by the ship becomes larger, controlling the current opening degree of the throttle to reduce the instantaneous oil supply amount of the main engine of the ship.

As an improvement of the embodiment of this invention, the method further comprises: if the resistance suffered by the ship becomes smaller and the change amount is not less than a preset threshold value, gradually increasing the instantaneous oil supply amount of the main engine of the ship, calculating an oil consumption amount corresponding to a predetermined distance under each instantaneous oil supply amount in real time to identify the minimum instantaneous oil supply amount for the predetermined distance, and keeping sailing under the minimum instantaneous oil supply amount until the resistance suffered by the ship changes and the change amount is not less than the preset threshold value; if the resistance suffered by the ship becomes larger and the change amount is not less than the preset threshold value, gradually reducing the instantaneous oil supply amount of the main engine of the ship, calculating an oil consumption amount corresponding to the predetermined distance under each instantaneous oil supply amount in real time to identify the minimum instantaneous oil supply amount for the predetermined distance, and keeping sailing under the minimum instantaneous oil supply amount until the resistance suffered by the ship changes and the change amount is not less than the preset threshold value.

As another improvement of the embodiment of this invention, an upper limit value and a lower limit value of a rotational speed of the main engine are configured, such that the main engine is controlled to operate between the upper and lower limit values by controlling the opening degree of the throttle.

As yet another improvement of the embodiment of this invention, before when the resistance suffered by the ship changes during routine sailing and the change amount of the resistance is not less than the preset threshold value, changing the operating parameters of the ship, the method further comprises: configuring a preset instantaneous oil supply amount; and keeping the main engine of the ship operating below the preset instantaneous oil supply amount by controlling the opening degree of the throttle during routine sailing, until the resistance suffered by the ship changes and the change amount is not less than the preset threshold value.

As yet another improvement of the embodiment of this invention, the method further comprises: gradually changing the instantaneous oil supply amount of the main engine of the ship, and calculating an oil consumption amount corresponding to the predetermined distance under each instantaneous oil supply amount; and calculating the minimum instantaneous oil supply amount corresponding to the predetermined distance, and taking the same as the preset instantaneous oil supply amount.

To achieve the above object of the present invention, yet another embodiment of the present invention provides a device for controlling energy-saving sailing of a ship, comprising: a detecting module configured to detect a ship speed relative to the ground and a ship speed relative to water in real time; a calculating module configured to calculate a difference between the ship speed relative to the ground and the ship speed relative to water; and a controlling module configured to control the current opening degree of a throttle to increase the instantaneous oil supply amount of a main engine of the ship if the ship speed relative to the ground is larger than the ship speed relative to water and the difference is not less than a preset value, and control the current opening degree of the throttle to reduce the instantaneous oil supply amount of the main engine of the ship if the ship speed relative to the ground is smaller than the ship speed relative to water and the difference is not less than the preset value, during routine sailing.

As an improvement of the embodiment of this invention, the controlling module is further configured to: if the ship speed relative to the ground is larger than the ship speed relative to water, gradually increase the instantaneous oil supply amount of the main engine of the ship, calculate an oil consumption amount corresponding to a predetermined distance under each instantaneous oil supply amount in real time to identify the minimum instantaneous oil supply amount for the predetermined distance, and keep sailing under the minimum instantaneous oil supply amount; and if the ship speed relative to the ground is smaller than the ship speed relative to water, gradually reduce the instantaneous oil supply amount of the main engine of the ship, calculate an oil consumption amount corresponding to the predetermined distance under each instantaneous oil supply amount in real time to identify the minimum instantaneous oil supply amount for the predetermined distance, and keep sailing under the minimum instantaneous oil supply amount.

As another improvement of the embodiment of this invention, the device further comprises: a configuring module to configure an upper limit value and a lower limit value of a rotational speed of the main engine, such that the main engine is controlled to operate between the upper and lower limit values by controlling the opening degree of the throttle.

As yet another improvement of the embodiment of this invention, the configuring module is further to configure a preset instantaneous oil supply amount; and the controlling module is further configured to keep the main engine of the ship to operate below the preset instantaneous oil supply amount by controlling the opening degree of the throttle during routine sailing, until the difference between the ship speed relative to the ground and the ship speed relative to water is not less than the preset value.

As yet another improvement of the embodiment of this invention, the controlling module is further configured to gradually change the instantaneous oil supply amount of the main engine of the ship; and the calculating module is further configured to calculate an oil consumption amount corresponding to the predetermined distance under each instantaneous oil supply amount, and calculate the minimum instantaneous oil supply amount corresponding to the predetermined distance, and take the same as the preset instantaneous oil supply amount.

To achieve the above object of the present invention, yet another embodiment of the present invention provides a device for controlling energy-saving sailing of a ship, comprising: a detecting module configured to detect a ship speed relative to the ground in real time; a calculating module configured to judge if a change amount of the ship speed relative to the ground is not less than a preset value under the same instantaneous oil supply amount; and a controlling module configured to, if the ship speed relative to the ground becomes larger and the change amount is not less than the preset value during routine sailing, control the current opening degree of a throttle to increase the instantaneous oil supply amount of a main engine of the ship; and if the ship speed relative to the ground becomes smaller and the change amount is not less than the preset value during routine sailing, control the current opening degree of the throttle to reduce the instantaneous oil supply amount of the main engine of the ship.

As an improvement of the embodiment of this invention, the controlling module is further configured to: if the ship speed relative to the ground becomes larger and the change amount is not less than a preset value, gradually increase the instantaneous oil supply amount of the main engine of the ship, calculate an oil consumption amount corresponding to a predetermined distance under each instantaneous oil supply amount in real time to identify the minimum instantaneous oil supply amount for the predetermined distance, and keep sailing under the minimum instantaneous oil supply amount; and if the ship speed relative to the ground becomes smaller and the change amount is not less than a preset value, gradually reduce the instantaneous oil supply amount of the main engine of the ship, calculate an oil consumption amount corresponding to the predetermined distance under each instantaneous oil supply amount in real time to identify the minimum instantaneous oil supply amount for the predetermined distance, and keep sailing under the minimum instantaneous oil supply amount.

As another improvement of the embodiment of this invention, the device further comprises: a configuring module to configure an upper limit value and a lower limit value of a rotational speed of the main engine, such that the main engine is controlled to operate between the upper and lower limit values by controlling the opening degree of the throttle.

As yet another improvement of the embodiment of this invention, the configuring module is further configured to configure a preset instantaneous oil supply amount; and the controlling module is further configured to keep the main engine of the ship to operate below the preset instantaneous oil supply amount by controlling the opening degree of the throttle during routine sailing, until the ship speed relative to the ground changes and the change amount is not less than the preset value.

As yet another improvement of the embodiment of this invention, the controlling module is further configured to gradually change the instantaneous oil supply amount of the main engine of the ship; and the calculating module is further configured to calculate an oil consumption amount corresponding to the predetermined distance under each instantaneous oil supply amount, calculate the minimum instantaneous oil supply amount corresponding to the predetermined distance, and take the same as the preset instantaneous oil supply amount.

Compared with the prior arts, the beneficial effects of the present invention are: energy consumption is significantly reduced, and the sailing cost is saved.

BRIEF DESCRIPTION OF THE DRAWINGS

FIG. 3 shows a flow chart of a method for controlling energy-saving sailing of a ship according to a first embodiment of the present invention;

FIG. 4 shows a flow chart of a method for controlling energy-saving sailing of a ship according to a second embodiment of the present invention;

DETAILED DESCRIPTION

Figure 1:
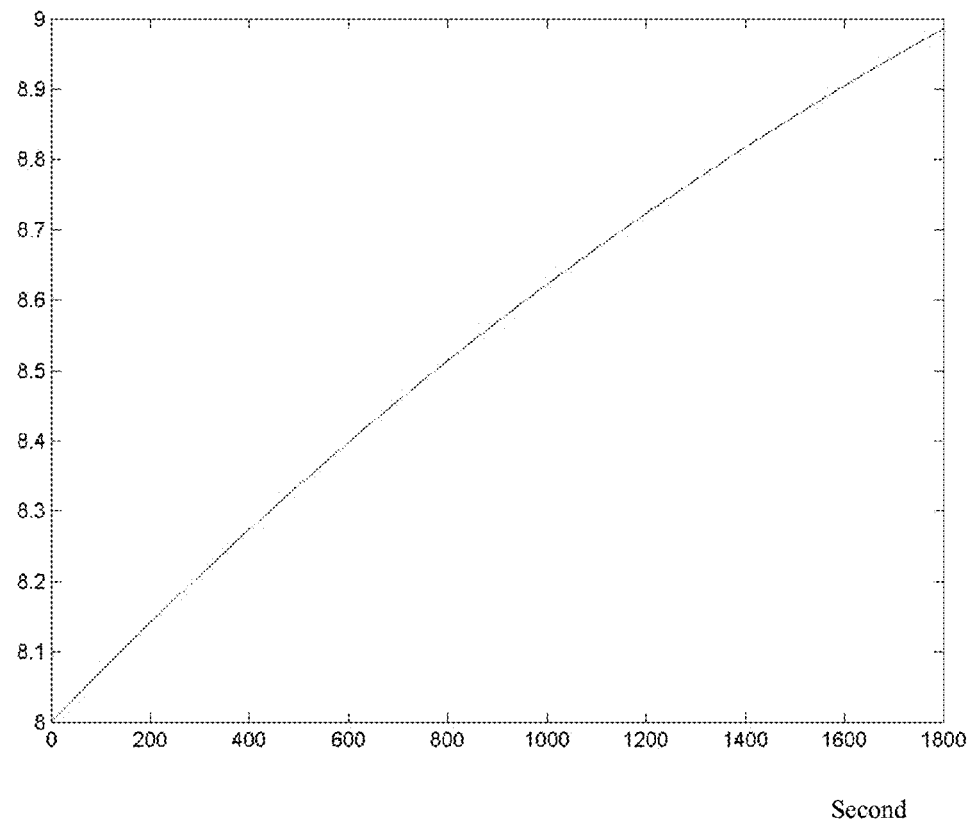
FIG. 1 schematically shows a ship in the prior arts in acceleration and sailing with a fixed rotational speed of the main engine of the ship.

To make the objects, technical solutions and advantages of this invention clearer, the followings will describe this invention in detail with reference to the accompanying drawings and embodiments.

When the power generated by the main engine of a ship is fixed, the ship's speed depends on the resistance suffered by the ship itself. When the ship is sailing in running water, as long as the ship speed relative to water is the same as the ship speed in still water, the resistance suffered by the ship is the smallest.

When a ship sails from point A to point B for a whole voyage, the ship will suffer resistance during traveling. Among them, water resistance and wind resistance are the main resistance suffered by the ship in the process of sailing.

The water resistance suffered by the ship is related with the relative speed between the ship and water in addition to the water bearing area. The wind resistance suffered by the ship is related with the relative speed between the ship and the wind in addition to the wind bearing area. For a ship, its water bearing area and wind bearing area are constant values. The water resistance and wind resistance suffered by the ship can be calculated according to the following resistance calculation formula: $f = c*s*v^2$, where c is a resistance coefficient of the ship relative to water or wind, s is the water or wind bearing area of the ship, which is a constant, and v is the ship speed relative to water or wind.

Under hydrostatic models, water is still water, or the absolute speed of water is 0; wind is calm wind, or the wind scale is 0. The resistance suffered by the ship can be calculated according to the following resistance calculation formula: $f = (c*s + c'*s')*v^2$, where c is a resistance coefficient of the ship relative to water and c' is a resistance coefficient of the ship relative to wind, both of which are constants, s is the water bearing area of the ship and s' is the wind bearing area of the ship, both of which are constants, and v is the ship speed relative to water or wind, which is an absolute speed relative to the ground.

At this time, the resistance works, and the work is $w = f*L$, where L is the distance traveled by the ship.

According to the above resistance calculation formulas, it is known that under hydrostatic models, the resistance will increase in case of acceleration, and deceleration will reduce the resistance.

In running water cases, there is an absolute water flow speed $v_{water}$. Assume the water flow speed has the same direction as the sailing direction in the first half of the travel distance and has the opposite direction to the sailing direction in the second half of the travel distance, the water flow speed is constant, and the ship speed relative to the ground for the whole travel distance is V. Then, the work performed by the resistance in the first half of the travel distance is: $w_{o1} = c*s*L/2*(v - v_{water})^2$, where c is a resistance coefficient of the ship relative to water and s is the water bearing area of the ship. The work performed by the resistance in the second half of the travel distance is: $w_{o2} = c*s*L/2*(v + v_{water})^2$. When not considering the wind resistance, the total work done by the resistance is $w = w_{o1} + w_{o2}$. In this case, the ship speed is adjusted. Specifically, acceleration $\Delta v$ is performed in case of sailing downstream, and deceleration $\Delta v$ is performed in case of sailing upstream. Then, the work performed by the resistance in the first half of the travel distance is: $w'_{o1} = c*s*L/2*(v - v_{water} + \Delta v)^2$ and the work performed by the resistance in the second half of the travel distance is: $w'_{o2} = c*s*L/2*(v + v_{water} - \Delta v)^2$. The total work done by the resistance is: $w' = w'_{o1} + w'_{o2}$. When subtracting w from w', the following equation can be obtained after reorganization: $\Delta w = c*s*L/2*(2*(\Delta v)^2 - 4*v_{water}*\Delta v)$. This is a quadratic function and the quadratic term coefficient is greater than 0, so there is a minimum value. After deformation of the above equation, the following equation can be obtained: $\Delta w = L*c*s*((\Delta v - v_{water})^2 - v_{water}^2)$. Thus, when $\Delta v = v_{water}$, the $\Delta w$ has a minimum value: $\Delta w = L*c*s*(-v_{water}^2)$. The reduction percentage is $$\frac{2*c*s*v_{water}^2}{c*s*((v - v_{water})^2 + (v + v_{water})^2)}.$$

Based on the above, if wind resistance is considered. Assume the scale and direction of wind during the whole voyage does not change. Thus, the wind may have the same direction as the sailing direction or has a direction opposite to the sailing direction. The work performed by the wind resistance may be represented as: $w_3 = c'*s'*L*(v \pm v_{wind})^2$, where c' is a resistance coefficient of the ship relative to wind and s' is the wind bearing area of the ship.

In this case, the work performed by the total resistance is $w = w_{o1} + w_{o2} + w_3$, where "+" represents upstream wind and "−" represents downstream wind.

In this case, the ship speed is adjusted. Specifically, acceleration $\Delta v$ is performed in case of sailing downstream, and deceleration $\Delta v$ is performed in case of sailing upstream. Then, in addition to the work done by water resistance, the work performed by the wind resistance during the whole travel distance is: $w'_3 = c'*s'*L/2*((v + \Delta v \pm v_{wind})^2 + (v - \Delta_v \pm v_{wind})^2)$, and the work performed by the total resistance during the whole travel distance is: $w' = w'_{o1} + w'_{o2} + w'_3$. When subtracting w from w', the following equation can be obtained after reorganization: $\Delta w = c*s*L/2*(2*(\Delta v)^2 - 4*v_{water}*\Delta v) + c*s'*L/2*(2*(\Delta v)^2 \pm 4*v*\Delta v)$. This is a quadratic function, and the quadratic term coefficient is greater than 0, so there is a minimum value. After deformation of the above equation, the following equation can be obtained:

$$\Delta w = L*(c*s + c'*s')*\left(\left(\Delta v \frac{c*s*v_{water} \pm c'*s'*v}{c*s + c'*s'}\right)^2 - \left(\frac{c*s*v_{water} \pm c'*s'*v}{c*s + c'*s'}\right)^2\right).$$

Thus, when $$\Delta v = \frac{c*s*v_{water} \pm c'*s'*v}{c*s + c'*s'},$$

the $\Delta w$ has a minimum value:

$$\Delta w = L*\frac{-(c*s*v_{water} \pm c'*s'*v)^2}{c*s + c'*s'}.$$

The reduction percentage is $$\frac{2*(c*s*v_{water} \pm c'*s'*v)^2}{(c*s*((v - v_{water})^2 + (v + v_{water})^2) + 2*c'*s'*(v \pm v_{wind})^2)*(c*s + c'*s')}.$$

For sailing with a fixed rotational speed of the main engine (namely, the ship sails with a fixed speed relative to water) of a ship in the prior arts, if wind is not considered, an experience rotational speed of the main engine of the ship is selected. The experience rotational speed of the main engine in still water corresponds to a stable ship speed. When the ship encounters downstream waters, as the resistance suffered by the ship is reduced, the ship speed increases; and vice versa.

In this case, the absolute ship speed in the first half of the travel distance equals to the sum of the ship speed corresponding to the experience rotational speed of the main engine and the water speed, the absolute ship speed in the second half of the travel distance equals to the difference after subtracting the water speed from the ship speed corresponding to the experience rotational speed of the main engine, and the resistance suffered by the ship during the whole the travel distance is the smallest.

There is an equation:

$$F - f = m^* \frac{dv}{dt},$$

where F is the power of the main engine, which is a fixed value, f the resistance, m the total mass of the ship, and $$\frac{dv}{dt}$$

the acceleration.

However, the larger the total mass of the ship is, the greater the inertia of the ship will be. As the resistance suffered by the ship when sailing downstream is relatively small, the acceleration of the ship is very small. As the ship speed increases, the resistance suffered by the ship increases too, the acceleration of the ship will become smaller, and the acceleration process will become longer. As shown in FIG. 1 and based on theoretical calculations, it needs infinite time for the acceleration to become equal to the water speed.

When there is change in water flow directions, or when downstream sailing is changed to upstream sailing, although the ship speed is reducing, as the deceleration is relatively small, the ship speed reduces from the original speed to a speed lower than the ship speed corresponding to the experience rotational speed of the main engine. Then, it needs a long time for the deceleration to become twice of the water speed $v_{water}$.

Therefore, although fuel consumption can be theoretically lowered using a fixed rotational speed of the main engine for sailing, as the acceleration and deceleration processes of the ship are actually very long, and water influence to the ship speed changes rapidly, the energy-saving effect is quite small. To achieve better energy-saving effect, human interference is needed. Specifically, after judging the water flow direction, the rotational speed of the main engine of the ship is increased or decreased actively, so that the absolute ship speed can meet the requirements.

If wind is considered, the situation is more complex. The increase or decrease of the ship speed is related with the water speed, the selected ship speed, the resistance coefficients of the ship relative to water and wind, and the water and wind bearing areas. But the increase or decrease is a fixed value.

Similarly, as the total mass of the ship is huge, it takes a long time to accelerate or decelerate for a fixed value based on the change of the resistance suffered by the ship. Therefore, human interference is needed.

Similarly, for sailing with a fixed power of the main engine of a ship in the prior arts, an experience power of the main engine of the ship is selected. The experience power of the main engine in still water corresponds to a stable ship speed. When the ship sails in running water, the change trend of the acceleration of the ship is the same as the case for a fixed rotational speed of the main engine. If there is weak wind, and the speed change amount equals to the water speed $v_{water}$, the total resistance suffered by the ship is the smallest.

If wind is not considered, the absolute ship speed is the same as the case for a fixed rotational speed of the main engine. Specifically, the absolute ship speed for downstream sailing equals to the sum of the ship speed corresponding to the fixed power of the main engine and the water speed, the absolute ship speed for upstream sailing equals to the difference after subtracting the water speed from the ship speed corresponding to the fixed power of the main engine, and the resistance suffered by the ship is the smallest.

The power of the main engine of the ship is $P_0$. There is an acceleration formula $$\frac{P_0}{v} - f = m^* \frac{dv}{dt},$$

where f is the resistance, m the total mass of the ship, and $$\frac{dv}{dt}$$

the acceleration.

Figure 2:
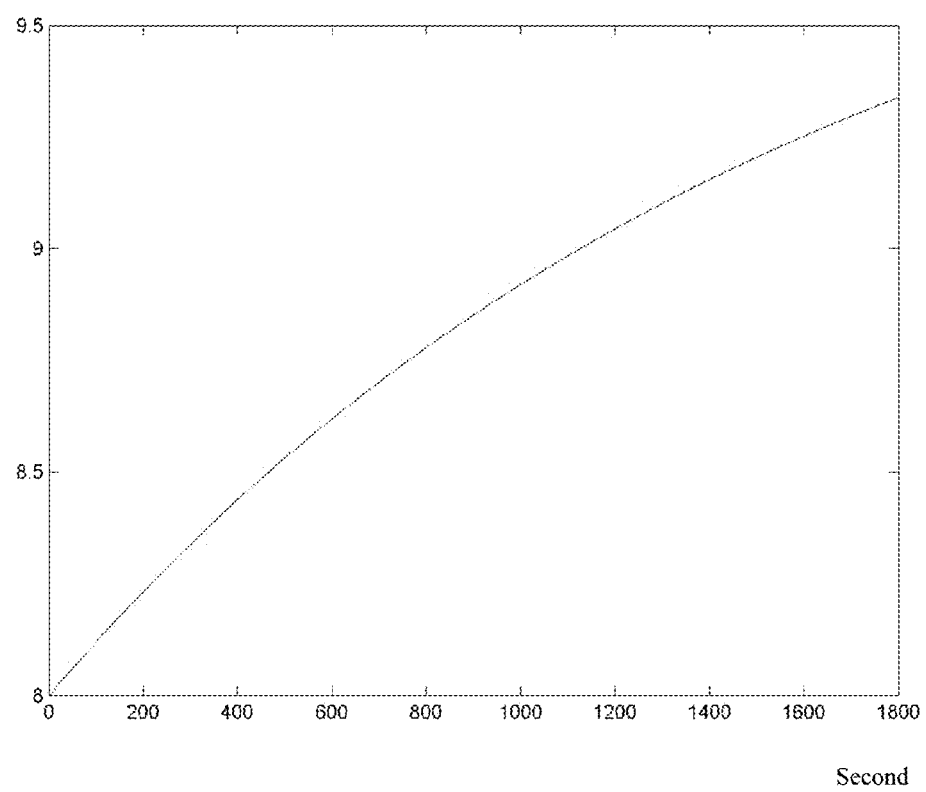
FIG. 2 schematically shows a ship in the prior arts in acceleration and sailing with a fixed power of the main engine of the ship.

Similar to the case for the acceleration change when sailing under a fixed rotational speed of the main engine of the ship, when the ship sails under a fixed power of the main engine, the acceleration becomes smaller as the sailing time increases. As shown in FIG. 2 and based on theoretical calculations, it needs infinite time for the acceleration to become equal to the water speed. In addition, during a process of converting from an acceleration stage to a deceleration stage, the ship speed first reduces to the ship speed in still water and then becomes even smaller. This process takes a longer period. When wind is considered, the cases become more complex, as the case for sailing under a fixed rotational speed of the main engine. But the acceleration formula $$\frac{P_0}{v} - f = m^* \frac{dv}{dt}$$

does not change. The representation formula of the resistance f will become more complex. From the above analysis, it can be concluded that: when the ship sails in running water, if the ship speed relative to water equals to the ship speed in still water, the resistance suffered by the ship is the smallest. In addition, no matter if the ship sails under a fixed rotational speed of the main engine or under a fixed power of the main engine, the response speed of the ship cannot meet the requirements. Therefore, this invention proposes a method and device for controlling energy-saving sailing of a ship, which can achieve energy-saving sailing and reduce the fuel consumption, the costs and the pollution. As shown in FIG. 3, in a first embodiment of this invention, the method for controlling energy-saving sailing of a ship comprises: configuring a preset instantaneous oil supply amount for a main engine of the ship; and keeping the main engine of the ship operating with the preset instantaneous oil supply amount by controlling the opening degree of a throttle during routine sailing.

Generally, the main engine of a ship uses a low-rotational speed and high-power diesel engine. The fuel supply of a diesel engine is performed by injecting fuel into the combustion chambers of the diesel engine by a fuel injection pump. The fuel injection amount by which the fuel injection pump injects fuel into the combustion chambers in one period is determined by the opening degree of the throttle and the rotational speed of the engine in that period. For example, the fuel injection pump injects fuel into the combustion chambers once for each rotation of the engine, and the fuel injection amount of the combustion chambers for each time is determined by the opening degree of the throttle.

In the present embodiment, in order to accurately control the fuel injection amount of the combustion chambers (namely, the instantaneous oil supply amount of the main engine of the ship), the control device may monitor the current instantaneous oil supply amount using a an oil meter. However, to stably control the instantaneous oil supply amount, this embodiment may define the current oil supply amount of the main engine (namely, the instantaneous oil supply amount of the main engine of the ship) as the current opening degree of the throttle multiplied by the current rotational speed of the main engine based on the relations among the opening degree of the throttle, the rotational speed of the main engine and the instantaneous oil supply amount of the main engine, to facilitate calculations.

In this way, the product of the current opening degree of the throttle and the current rotational speed of the main engine may be set as a fixed value. The preset instantaneous oil supply amount of the main engine of the ship may be kept constant by controlling the opening degree of the throttle (i.e., the greater the opening degree of the throttle is, the larger the oil injection amount for each injection and the higher the rotational speed of the main engine will be). At the same time, a relative balance point between the opening degree of the throttle and the rotational speed of the main engine can be identified.

During sailing to the sea, a ship usually undergoes the processes of departing from a harbor, entering a harbor, sailing to the sea along the river and the like. The control method of this embodiment mainly focuses on the control of the ship during routine sailing on the sea. Routine sailing refers to a case where the ship speed is determined by the performance of the main engine of the ship and the resistance suffered by the ship (including wind resistance, water resistance and the like), and other human factors are not considered, such as traffic rules, sailing principles and the like. Routine sailing usually occurs when a ship sails on the sea, and is kept by the ship for most of the travel distance.

It should be noted that the concepts of instantaneous oil supply amount of the main engine of the ship and routine sailing are also applicable to other embodiments of this invention.

Sailing conditions on the sea are always changing. In actual sailing, a ship cannot always sail upstream or downstream due to tides and the monsoon. In this embodiment, by controlling the instantaneous oil supply amount of a main engine of the ship, no matter how much external resistance the ship suffers, the instantaneous oil supply amount is always supplied for sailing, or the main engine of the ship always operates under a fixed instantaneous oil supply amount.

As such, in this embodiment, when the load of the main engine of the ship increases, the current opening degree of the throttle may be increased to reach a new balance point with the rotational speed of the main engine; and when the load of the main engine of the ship decreases, the current opening degree of the throttle may be decreased to reach a new balance point with the rotational speed of the main engine.

Compared with a traditional sailing manner with a fixed rotational speed or fixed power of the main engine of the ship, the control method of this embodiment can actively change the operating parameters of the main engine of the ship according to the external resistance of the ship.

It can be understood that when the external resistance of the ship decreases (e.g., when sailing downstream), the resistance suffered by the propeller of the ship decreases (e.g., there is additional driving power when sailing downstream), and the load of the main engine decreases. Under the same instantaneous oil supply amount of the main engine, the rotational speed of the main engine increases, the main engine performs more work and the ship speed increases (equivalent to active accelerating). When the external resistance of the ship increases (e.g., when sailing upstream), the resistance suffered by the propeller of the ship increases, and the load of the main engine increases. Under the same instantaneous oil supply amount of the main engine, the rotational speed of the main engine decreases, the main engine performs less work and the ship speed decreases (equivalent to active decelerating). Based on the above theory, compared with a traditional sailing manner with a fixed rotational speed or fixed power of the main engine of the ship, the control method of this embodiment can pace up the response speed of the ship after the resistance changes, so that $\Delta w$ can decrease more quickly, and better fuel-saving effect can be achieved.

When the load of the ship is fixed, after several actual sailing testing (the ship travels from Changshu harbor in Jiangsu province of eastern China to Qinhuangdao harbor in Hebei province of northern China with a maximum allowable sailing time of 55 hours), it is found that the oil consumption for a single trip using the control method of this embodiment is 2-3 tons less than that under a fixed rotational speed of the main engine. If converted at the market price of RMB 4,300 per ton of heavy oil, RMB 8,600-12,900 can be saved for a single trip for one ship. Thus, energy consumption and the sailing cost are greatly reduced.

Further, in this embodiment, the preset instantaneous oil supply amount can be set according to the sailing experience or according to the following solution.

For example, the lowest allowable sailing speed can be calculated based on the sailing distance and the maximum allowable sailing time. The required instantaneous oil supply amount of the main engine can be calculated based on the lowest allowable sailing speed and the load of the main engine when sailing in still water, and is taken as the preset instantaneous oil supply amount of the main engine. Usually, the sailing time from a starting point to a destination is a range allowing fluctuations. For example, the sailing time from Changshu harbor to Qinhuangdao harbor may be between 50 and 55 hours, so the maximum allowable sailing time is 55 hours. In this way, the lowest allowable sailing speed can be calculated based on the sailing distance and the maximum allowable sailing time. As mentioned above, a ship during sailing on the sea cannot always sail upstream or downstream. Therefore, the load of the main engine for sailing in still water is used as a reference for calculations of the preset instantaneous oil supply amount. In this embodiment, as the maximum allowable sailing time is used, the minimum preset instantaneous oil supply amount can be found.

For example, the instantaneous oil supply amount of the main engine of the ship may be gradually changed, an oil consumption amount corresponding to a predetermined distance under each instantaneous oil supply amount may be calculated, the minimum instantaneous oil supply amount corresponding to the predetermined distance may be calculated, and the minimum instantaneous oil supply amount may be taken as the preset instantaneous oil supply amount. In this solution, the instantaneous oil supply amount of the main engine of the ship may be gradually changed after the ship starts sailing or after the ship enters routine sailing. An oil consumption amount corresponding to a predetermined distance (such as 100 nautical miles) may be calculated based on an increasingly stable ship speed under each instantaneous oil supply amount (as after the ship changes the instantaneous oil supply amount, there is a time delay before the changed ship speed is stable, and the ship speed can hardly stay at an accurate value during sailing, the changed ship speed can only be an increasingly stable ship speed). In this way, after trying several instantaneous oil supply amounts, the minimum instantaneous oil supply amount corresponding to the predetermined distance may be found. Of course, in this embodiment, the instantaneous oil supply amount of the main engine of the ship may be changed for once after one period (which is usually 15 minutes), so that the changed instantaneous oil supply amount can be reflected by the changed ship speed. Using such a solution, the optimal preset instantaneous oil supply amount can be found smartly.

Of course, before the instantaneous oil supply amount of the main engine of the ship is gradually changed, the ship may sail under the minimum preset instantaneous oil supply amount calculated based on the above solution.

Further, usually a ship has a safe operation range. An excessively low rotational speed of the main engine will cause stopping of the main engine, while an excessively high rotational speed of the main engine will cause breaking thereof. In addition, the rotational speed characteristics of a diesel main engine (a rotational speed of the main engine has a cube relation with oil consumption) show that in case of an excessively low rotational speed of the main engine, the air intake rate is low, atomization of fuel is poor, heat loss is large and the oil consumption amount is large; in case of an excessively high rotational speed of the main engine, the mechanical loss is large, and the oil consumption amount is large. Therefore, the oil consumption amount increases either in case of an excessively high or an excessively low rotational speed of the main engine, and there is an ideal economical rotational speed of the main engine in the rotational speed range thereof.

To prevent the operation of the main engine of the ship from exceeding the safe range due to changes of the instantaneous oil supply amount or to ensure the main engine of the ship to operate within an economical rotational speed range, an upper limit value and a lower limit value of the rotational speed of the main engine may be configured, such that the main engine is controlled to operate between the upper and lower limit values by controlling the opening degree of the throttle. In other words, there is a range for the changing instantaneous oil supply amount. The instantaneous oil supply amount cannot be larger than the instantaneous oil supply amount corresponding to the upper limit value of the rotational speed of the main engine, or lower than the instantaneous oil supply amount corresponding to the lower limit value of the rotational speed of the main engine, so that the main engine can operate safely and/or economically.

As shown in FIG. 4, in a second embodiment of this invention, the method for controlling energy-saving sailing of a ship, comprises: when a resistance suffered by the ship changes during routine sailing, changing the operating parameters of the ship; if the resistance suffered by the ship becomes smaller, controlling the current opening degree of a throttle to increase the instantaneous oil supply amount of a main engine of the ship; and if the resistance suffered by the ship becomes larger, controlling the current opening degree of the throttle to reduce the instantaneous oil supply amount of the main engine of the ship.

Compared with the first embodiment, the second embodiment can adjust the operating parameters of the main engine of the ship more actively, the response speed of the ship to resistance change can be improved, and better oil-saving effect can be achieved.

Further, the resistance change during sailing may be judged by various ways, such as using a sensor or using the following solutions.

For example, a ship speed relative to the ground and a ship speed relative to water may be acquired in real time; and if a resistance suffered by the ship changes is judged according to the ship speed relative to the ground and the ship speed relative to water. Theoretically, if seawater is still seawater and wind is calm wind, the ship speed relative to the ground should be the same as the ship speed relative to water. However, when seawater flows and/or wind blows, the ship speed relative to the ground will be different from the ship speed relative to water: when the ship sails downstream (including the combined influence of water flow and wind), the ship speed relative to water is smaller than the ship speed relative to the ground; and when the ship sails upstream, the ship speed relative to the ground is smaller than the ship speed relative to water. The ship speed relative to the ground may be acquired by GPS devices or the like, and the ship speed relative to water may be acquired by a corresponding sensor assembled on the ship. It can be understood that, under the same instantaneous oil supply amount, when the ship speed relative to the ground and the ship speed relative to water changes or a difference therebetween changes, the resistance suffered by the ship changes.

For example, the ship speed relative to the ground may be acquired in real time; and if the ship speed relative to the ground changes, it is judged that the resistance suffered by the ship changes. Referring to the above description, it can be understood that the ship speed relative to the ground should remain constant under the same instantaneous oil supply amount, and the resistance suffered by the ship changes if the ship speed relative to the ground changes. It is worthy of being noted that the technical solution in this embodiment is a dynamic control solution actively fed back by the ship according to external conditions. It can be understood that, after the resistance suffered by the ship, if the resistance suffered by the ship changes relative to the changed resistance may be judged continuously, and if so, operating parameters of the ship are correspondingly adjusted. As such, the instantaneous oil supply amount of the main engine of the ship may be adjusted continually and actively according to changes of external conditions to optimize the oil consumption amount of the ship.

Further, in this embodiment, the instantaneous oil supply amount may be increased or decreased properly according to the sailing experience, or the changed optimal instantaneous oil supply amount may also be calculated according to the following solution.

Further, in this embodiment, if the resistance suffered by the ship becomes smaller, the instantaneous oil supply amount of the main engine of the ship is gradually increased, an oil consumption amount corresponding to a predetermined distance under each instantaneous oil supply amount is calculated in real time to identify the minimum instantaneous oil supply amount for the predetermined distance, and sailing is kept under the minimum instantaneous oil supply amount until the resistance suffered by the ship changes.

If the resistance suffered by the ship becomes larger, the instantaneous oil supply amount of the main engine of the ship is gradually reduced, the oil consumption amount corresponding to the predetermined distance under each instantaneous oil supply amount is calculated in real time to identify the minimum instantaneous oil supply amount for the predetermined distance, and sailing is kept under the minimum instantaneous oil supply amount until the resistance suffered by the ship changes.

In this solution, an oil consumption amount corresponding to a predetermined distance (such as 100 nautical miles) may be calculated based on an increasingly stable ship speed under each instantaneous oil supply amount (as after the ship changes the instantaneous oil supply amount, there is a time delay before the changed ship speed is stable, and the ship speed can hardly stay at an accurate value during sailing, the changed ship speed can only be an increasingly stable ship speed). In this way, after trying several instantaneous oil supply amounts, the minimum instantaneous oil supply amount corresponding to the predetermined distance may be found. Of course, in this embodiment, the instantaneous oil supply amount of the main engine of the ship may be changed for once after one period (which is usually 15 minutes), so that the changed instantaneous oil supply amount can be reflected by the changed ship speed. Using such a solution, the optimal preset instantaneous oil supply amount suitable for the ship can be found smartly.

Further, usually a main engine of a ship has a safe operation range. An excessively low rotational speed of the main engine will cause stopping of the main engine, while an excessively high rotational speed of the main engine will cause breaking thereof. In addition, the rotational speed characteristics of a diesel main engine (a rotational speed of the main engine has a cube relation with oil consumption amount) show that in case of an excessively low rotational speed of the main engine, the air intake rate is low, atomization of fuel is poor, heat loss is large and the oil consumption amount is large; and in case of an excessively high rotational speed of the main engine, the mechanical loss is large, and the oil consumption amount is large. Therefore, the oil consumption amount correspondingly increases either in case of an excessively high or an excessively low rotational speed of the main engine, and there is an ideal economical rotational speed of the main engine in the rotational speed range thereof.

To prevent the operation of the main engine of the ship from exceeding the safe range due to changes of the instantaneous oil supply amount or to ensure the main engine of the ship to operate within an economical rotational speed range, an upper limit value and a lower limit value of the rotational speed of the main engine of the ship may be configured, such that the main engine of the ship is controlled to operate between the upper and lower limit values by controlling the opening degree of the throttle. In other words, there is a range for the changing instantaneous oil supply amount. The instantaneous oil supply amount cannot be larger than the instantaneous oil supply amount corresponding to the upper limit value of the rotational speed of the main engine of the ship, or lower than the instantaneous oil supply amount corresponding to the lower limit value of the rotational speed of the main engine of the ship, so that the main engine of the ship can operate safely and/or economically. Further, in this embodiment, a preset instantaneous oil supply amount may be configured in advance prior to actively feeding back and controlling the operating parameters of the ship, and the main engine of the ship is kept to operate under the preset instantaneous oil supply amount by controlling the opening degree of the throttle until the resistance suffered by the ship changes.

In this embodiment, the preset instantaneous oil supply amount can be set according to the sailing experience or calculated and set according to the following solution.

For example, the lowest allowable sailing speed can be calculated based on the sailing distance and the maximum allowable sailing time. The required instantaneous oil supply amount of the main engine can be calculated based on the lowest allowable sailing speed and the load of the main engine of the ship when sailing in still water, and is taken as the preset instantaneous oil supply amount of the main engine. Usually, the sailing time from a starting point to a destination is a range allowing fluctuations. For example, the sailing time from Changshu harbor to Qinhuangdao harbor may be between 50 and 55 hours, so the maximum allowable sailing time is 55 hours. In this way, the lowest allowable sailing speed can be calculated based on the sailing distance and the maximum allowable sailing time. As mentioned above, a ship during sailing on the sea cannot always sail upstream or downstream. Therefore, the load of the main engine for sailing in still water is used as a reference for calculations of the preset instantaneous oil supply amount. In this embodiment, as the maximum allowable sailing time is used, the minimum preset instantaneous oil supply amount can be found.

For example, the instantaneous oil supply amount of the main engine of the ship may be gradually changed, an oil consumption amount corresponding to a predetermined distance under each instantaneous oil supply amount may be calculated, the minimum instantaneous oil supply amount corresponding to the predetermined distance may be calculated, and the minimum instantaneous oil supply amount may be taken as the preset instantaneous oil supply amount. In this solution, the instantaneous oil supply amount of the main engine of the ship may be gradually changed after the ship starts sailing or after the ship enters routine sailing. An oil consumption amount corresponding to a predetermined distance (such as 100 nautical miles) may be calculated based on an increasingly stable ship speed under each instantaneous oil supply amount (as after the ship changes the instantaneous oil supply amount, there is a time delay before the changed ship speed is stable, and the ship speed can hardly stay at an accurate value during sailing, the changed ship speed can only be an increasingly stable ship speed). In this way, after trying several instantaneous oil supply amounts, the minimum instantaneous oil supply amount corresponding to the predetermined distance may be found. Of course, in this embodiment, the instantaneous oil supply amount of the main engine of the ship may be changed for once after one period (which is usually 15 minutes), so that the changed instantaneous oil supply amount can be reflected by the changed ship speed. Using such a solution, the optimal preset instantaneous oil supply amount suitable for the ship can be found smartly.

Of course, before the instantaneous oil supply amount of the main engine of the ship is gradually changed, the ship may sail under the minimum preset instantaneous oil supply amount calculated based on the above solution.

Figure 5:
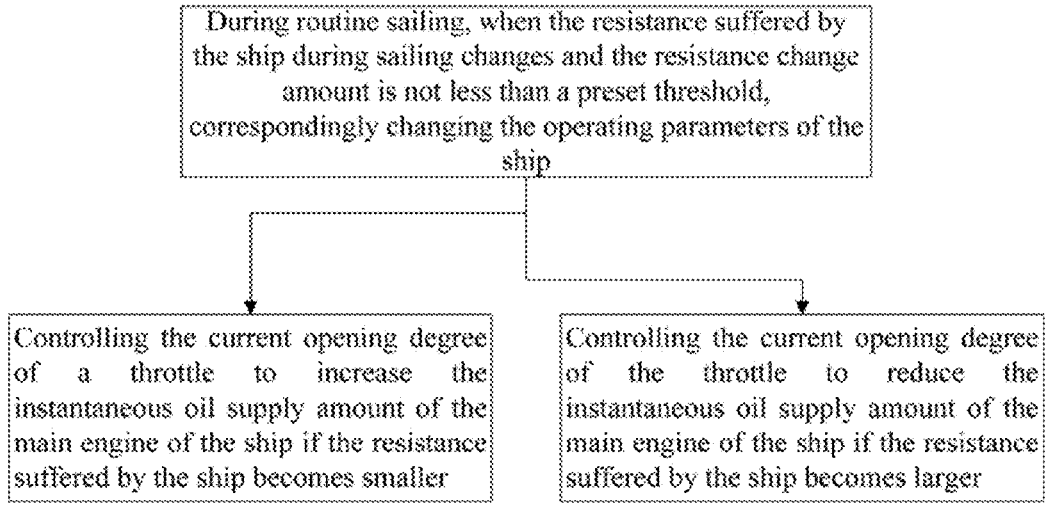
FIG. 5 shows a flow chart of a method for controlling energy-saving sailing of a ship according to a third embodiment of the present invention.

As shown in FIG. 5. in a third embodiment of this invention, a method for controlling energy-saving sailing of a ship differs from the second embodiment in that: in this embodiment, the operating parameters of the ship may not correspondingly change until the change amount of a resistance suffered by the ship is not less than a preset threshold. This is because it needs to frequently change the operating parameters (such as the instantaneous oil supply amount) of the ship if the resistance suffered by the ship during sailing frequently changes, which is not favorable for energy-saving.

Therefore, in this embodiment, it is necessary to configure a preset threshold in advance. In this way, the instantaneous oil supply amount of the main engine of the ship may not correspondingly change until the change amount of the resistance suffered by the ship is not less than the preset threshold; as such, it is more favorable for energy-saving of the ship.

Further, the resistance change may be calculated using a sensor, or according to a relative relation between the ship speed relative to the ground and the ship speed relative to water, and/or according to the resistance condition reflected by the change of the ship speed relative to the ground.

Figure 6:
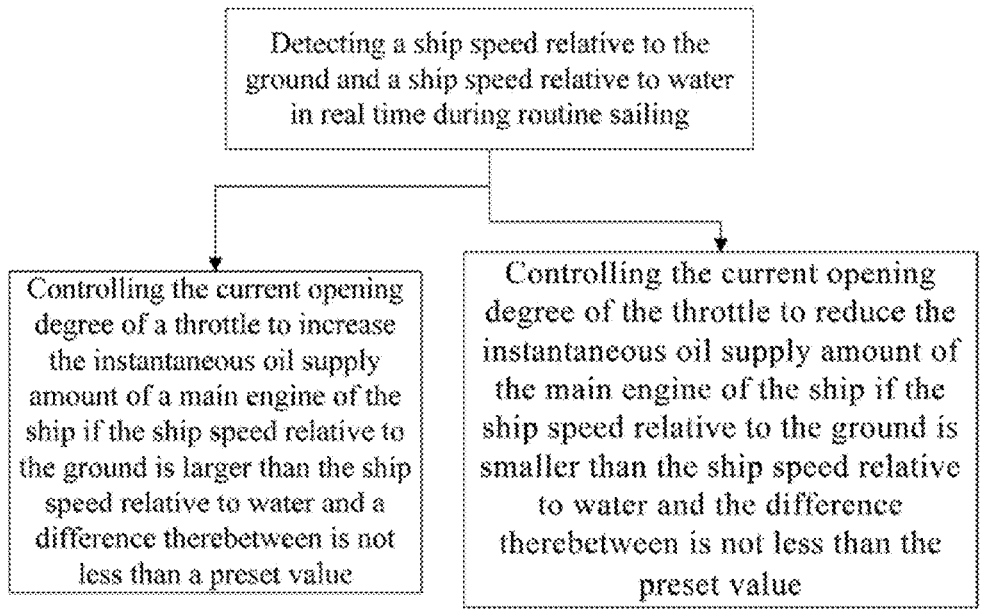
FIG. 6 shows a flow chart of a method for controlling energy-saving sailing of a ship according to a fourth embodiment of the present invention.

As shown in FIG. 6, in an fourth embodiment of this invention, the method for controlling energy-saving sailing of a ship, relative to the third embodiment, may merely consider the relation between the ship speed relative to the ground and the ship speed relative to water to judge the current resistance suffered by the ship; that is, it only judges if the ship sails downstream or upstream currently.

Meanwhile, if the instantaneous oil supply amount of the main engine of the ship needs to change may be judged according to a difference between the ship speed relative to ground and the ship speed relative to water, specifically includes: controlling the current opening degree of a throttle to increase the instantaneous oil supply amount of a main engine of the ship if the ship speed relative to the ground is larger than the ship speed relative to water and a difference therebetween is not less than a preset value; and controlling the current opening degree of the throttle to reduce the instantaneous oil supply amount of the main engine of the ship if the ship speed relative to the ground is smaller than the ship speed relative to water and the difference therebetween is not less than the preset value.

A sailing tendency chart of the ship specifically adopted in actual sailing will be illustrated as below in conjunction with FIG. 10.

Generally, if the difference between the ship speed relative to the ground and the ship speed relative to water is not less than 0.5 knot (unit of sailing speed), the instantaneous oil supply amount of the ship is adjusted by controlling the opening degree of the throttle.

Figure 7:
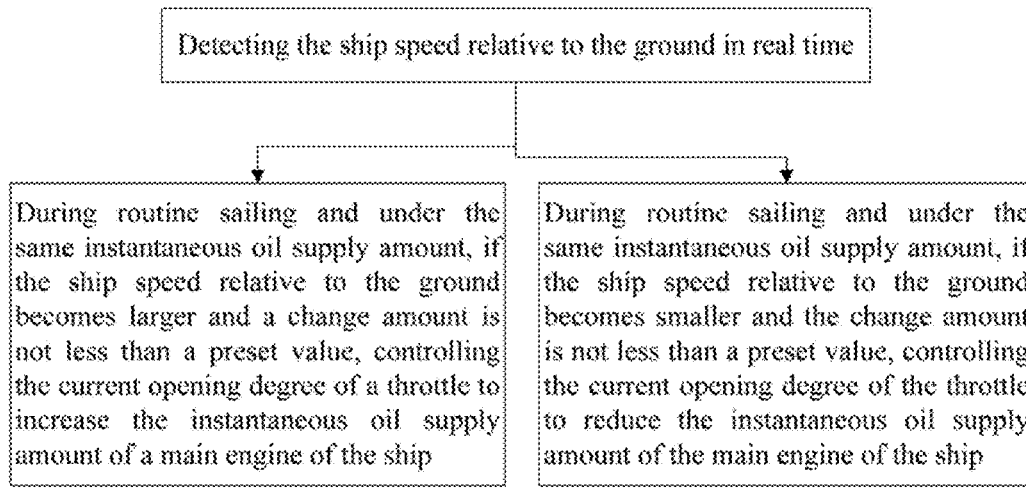
FIG. 7 shows a flow chart of a method for controlling energy-saving sailing of a ship according to a fifth embodiment of the present invention.

As shown in FIG. 7, in a fifth embodiment of this invention, the method for controlling energy-saving sailing of a ship, relative to the third embodiment, may merely consider the ship speed relative to the ground to judge the current resistance suffered by the ship according to the ship speed relative to the ground; that is, it only judges if the ship sails downstream or upstream currently.

Meanwhile, if the instantaneous oil supply amount of the main engine of the ship needs to change may be judged according to the change amount of the ship speed relative to ground, specifically includes: if the ship speed relative to the ground becomes larger and the change amount is not less than a preset value, controlling the current opening degree of the throttle to increase the instantaneous oil supply amount of the main engine of the ship; and if the ship speed relative to the ground becomes smaller and the change amount is not less than a preset value, controlling the current opening degree of the throttle to reduce the instantaneous oil supply amount of the main engine of the ship.

Generally, if the change amount of the ship speed relative to the ground is not less than 0.5 knot (unit of sailing speed), the instantaneous oil supply amount of the ship is adjusted by controlling the opening degree of the throttle.

Figure 8:
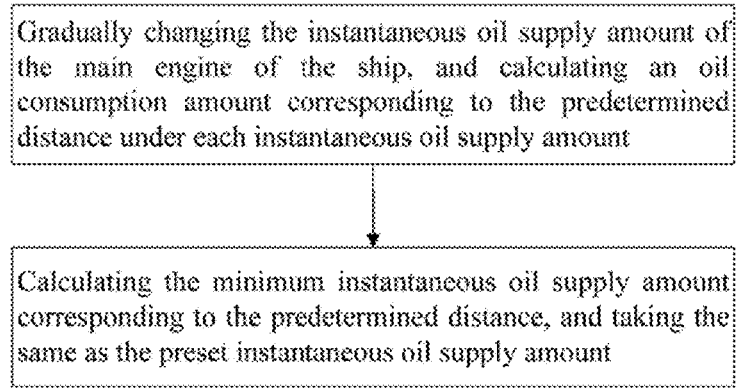
FIG. 8 shows a flow chart of a method for controlling energy-saving sailing of a ship according to a sixth embodiment of the present invention.

As shown in FIG. 8, in a sixth embodiment of this invention, the method for controlling energy-saving sailing of a ship, relative to the above embodiment, focuses on determining an optimal instantaneous oil supply amount in an optimizing manner and keeping sailing under the calculated optimal instantaneous oil supply amount, such that an obvious oil-saving effect can be achieved. The control method of this embodiment comprises: gradually changing the instantaneous oil supply amount of the main engine of the ship, and calculating an oil consumption amount corresponding to a predetermined distance under each instantaneous oil supply amount; and calculating the minimum instantaneous oil supply amount for the predetermined distance, and keeping sailing under the minimum instantaneous oil supply amount.

In this embodiment, the instantaneous oil supply amount of the main engine of the ship may be gradually changed after the ship starts sailing or after the ship enters routine sailing. An oil consumption amount corresponding to a predetermined distance (such as 100 nautical miles) may be calculated based on an increasingly stable ship speed under each instantaneous oil supply amount (as after the ship changes the instantaneous oil supply amount, there is a time delay before the changed ship speed is stable, and the ship speed can hardly stay at an accurate value during sailing, the changed ship speed can only be an increasingly stable ship speed). In this way, after trying several instantaneous oil supply amounts, the minimum instantaneous oil supply amount corresponding to the predetermined distance may be found. Of course, in this embodiment, the instantaneous oil supply amount of the main engine of the ship may be changed for once after one period (which is usually 15 minutes), so that the changed instantaneous oil supply amount can be reflected by the changed ship speed. Using such a solution, the optimal preset instantaneous oil supply amount suitable for the ship can be found smartly.

Further, usually a main engine of a ship has a safe operation range. An excessively low rotational speed of the main engine will cause stopping of the main engine, while an excessively high rotational speed of the main engine will cause breaking thereof. In addition, the rotational speed characteristics of a diesel main engine (a rotational speed of the main engine has a cube relation with oil consumption amount) show that in case of an excessively low rotational speed of the main engine, the air intake rate is low, atomization of fuel is poor, heat loss is large and the oil consumption amount is large; and in case of an excessively high rotational speed of the main engine, the mechanical loss is large, and the oil consumption amount is large. Therefore, the oil consumption amount correspondingly increases either in case of an excessively high or an excessively low rotational speed of the main engine, and there is an ideal economical rotational speed of the main engine in the rotational speed range thereof.

To prevent the operation of the main engine of the ship from exceeding the safe range due to changes of the instantaneous oil supply amount or to ensure the main engine of the ship to operate within an economical rotational speed range, an upper limit value and a lower limit value of the rotational speed of the main engine of the ship may be configured, such that the main engine of the ship is controlled to operate between the upper and lower limit values by controlling the opening degree of the throttle. In other words, there is a range for the changing instantaneous oil supply amount. The instantaneous oil supply amount cannot be larger than the instantaneous oil supply amount corresponding to the upper limit value of the rotational speed of the main engine of the ship, or lower than the instantaneous oil supply amount corresponding to the lower limit value of the rotational speed of the main engine of the ship, so that the main engine of the ship can operate safely and/or economically. Further, referring to the second to the fifth embodiments, the instantaneous oil supply amount of the main engine of the ship, that needs to be adjusted properly, is judged, which will not be repeated herein.

Figure 9:
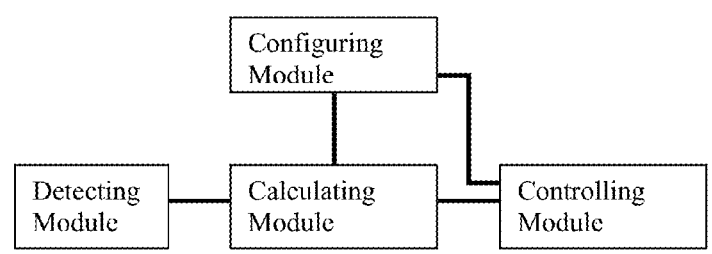
FIG. 9 shows a block view of a device for controlling energy-saving sailing of a ship according to an embodiment of the present invention.

As shown in FIG. 9, the device for controlling energy-saving sailing of a ship in one embodiment of this invention is applicable to the first to the sixth embodiments. A controlling module 200 described below is configured to control the opening degree of a throttle to adjust the instantaneous oil supply amount of a main engine of the ship.

For description clarity and conciseness, this application merely adopts one drawing. Of course, modules which are not used in the corresponding embodiments may be removed from the control device; for example, the control device may only comprise a configuring module 100, a controlling module 200 and a calculating module 300 when corresponding to the first embodiment, and so on.

When the device for controlling energy-saving sailing of a ship corresponds to the first embodiment, said device comprises:

a configuring module 100 configured to configure a preset instantaneous oil supply amount of a main engine of the ship;

a controlling module 200 configured to keep the main engine of the ship to operate always below the preset instantaneous oil supply amount by controlling the current opening degree of a throttle during routine sailing.

Generally, a main engine of a ship uses a low-rotational speed and high-power diesel engine. The fuel supply of a diesel engine is performed by injecting fuel into the combustion chambers of the diesel engine by a fuel injection pump. The fuel injection amount by which the fuel injection pump injects fuel into the combustion chambers in one period is determined by the opening degree of the throttle and the rotational speed of the main engine in that period. For example, the fuel injection pump injects fuel into the combustion chambers once for each rotation of the engine, and the fuel injection amount of the combustion chambers for each time is determined by the opening degree of the throttle.

In this embodiment, in order to accurately control the fuel injection amount of the combustion chambers (namely, the instantaneous oil supply amount of the main engine of the ship), the control device may monitor the current instantaneous oil supply amount using a an oil meter. However, to stably control the instantaneous oil supply amount, this embodiment may define the current oil supply amount of the main engine (namely, the instantaneous oil supply amount of the main engine of the ship) as the current opening degree of the throttle multiplied by the current rotational speed of the main engine based on the relations among the opening degree of the throttle, the rotational speed of the main engine and the instantaneous oil supply amount of the main engine, to facilitate calculations.

In this way, the product of the current opening degree of the throttle and the current rotational speed of the main engine may be set as a fixed value. The preset instantaneous oil supply amount of the main engine of the ship may be kept constant by controlling the opening degree of the throttle (i.e., the greater the opening degree of the throttle is, the larger the oil injection amount for each injection and the higher the rotational speed of the main engine will be). At the same time, a relative balance point between the opening degree of the throttle and the rotational speed of the main engine can be identified.

During sailing to the sea, a ship usually undergoes the processes of departing from a harbor, entering a harbor, sailing to the sea along the river and the like. The control method of this embodiment mainly focuses on the control of the ship during routine sailing on the sea. Routine sailing refers to a case where the ship speed is determined by the performance of the main engine of the ship and the resistance suffered by the ship (including wind resistance, water resistance and the like), and other interference factors are not considered, such as traffic rules, sailing principles and the like. Routine sailing usually occurs when a ship sails on the sea, and is kept by the ship for most of the travel distance. Sailing conditions on the sea are always changing. In actual sailing, a ship cannot always sail upstream or downstream due to tides and the monsoon. In this embodiment, by controlling the instantaneous oil supply amount of the main engine of the ship, no matter how much external resistance the ship suffers, the instantaneous oil supply amount is always supplied for sailing, that is, the main engine of the ship always operates under the instantaneous oil supply amount.

As such, in this embodiment, the controlling module is further configured to: when the load of the main engine of the ship increases, increase the current opening degree of the throttle to reach a new balance point with the current rotational speed of the main engine; and when the load of the main engine of the ship decreases, decrease the current opening degree of the throttle to reach a new balance point with the current rotational speed of the main engine.

Compared with a traditional sailing manner with a fixed rotational speed or fixed power of the main engine of the ship, the control method of this embodiment can actively change the operating parameters of the main engine of the ship according to the external resistance of the ship.

It can be understood that when the external resistance of the ship decreases (e.g., when sailing downstream), the resistance suffered by a propeller of the ship decreases (e.g., there is additional driving power when sailing downstream), and the load of the main engine decreases. Under the same instantaneous oil supply amount of the main engine, the rotational speed of the main engine increases, the main engine performs more work and the ship speed increases (equivalent to active accelerating). When the external resistance of the ship increases (e.g., when sailing upstream), correspondingly, the resistance suffered by the propeller of the ship increases, and the load of the main engine increases. Under the same instantaneous oil supply amount of the main engine, the rotational speed of the main engine decreases, the main engine performs less work and the ship speed decreases (equivalent to active decelerating).

Based on the above theory, compared with a traditional sailing manner with a fixed rotational speed or fixed power of the main engine of the ship, the control method of this embodiment can pace up the response speed of the ship after the resistance changes, so that $\Delta w$ can decrease more quickly, and better fuel-saving effect can be achieved for the sailing of the ship. When the load of the ship is fixed, after several actual sailing testing (the ship travels from Changshu harbor to Qinhuangdao harbor with a maximum allowable sailing time of 55 hours), it is found that the oil consumption for a single trip using the control method of this embodiment is 2-3 tons less than that under a fixed rotational speed of the main engine. If converted at the market price of RMB 4,300 per ton of heavy oil, RMB 8,600-12,900 can be saved for a single trip for one ship. Thus, energy consumption and the sailing cost are greatly reduced.

Further, in this embodiment, the preset instantaneous oil supply amount can be set according to the sailing experience or through the calculating module 300.

The calculating module 300 is configured to: calculate the lowest allowable sailing speed based on the sailing distance and the maximum allowable sailing time; and calculate the required instantaneous oil supply amount of the main engine based on the lowest allowable sailing speed and the load of the main engine when sailing in still water, and take the same as the preset instantaneous oil supply amount of the main engine. Usually, the sailing time from a starting point to a destination is a range allowing fluctuations. For example, the sailing time from Changshu harbor to Qinhuangdao harbor may be between 50 and 55 hours, so the maximum allowable sailing time is 55 hours. In this way, the lowest allowable sailing speed can be calculated based on the sailing distance and the maximum allowable sailing time. As mentioned above, a ship during sailing on the sea cannot always sail upstream or downstream. Therefore, the load of the main engine for sailing in still water is used as a reference for calculations of the preset instantaneous oil supply amount. In this embodiment, as the maximum allowable sailing time is used, the minimum preset instantaneous oil supply amount can be found.

The calculating module 300 may also cooperate with the controlling module 200. The controlling module 200 is configured to gradually change the instantaneous oil supply amount of the main engine of the ship. The calculating module 300 is configured to calculate an oil consumption amount corresponding to a predetermined distance under each instantaneous oil supply amount; and calculate the minimum instantaneous oil supply amount corresponding to the predetermined distance, and take the same as the preset instantaneous oil supply amount. In this solution, the instantaneous oil supply amount of the main engine of the ship may be gradually changed after the ship starts sailing or after the ship enters routine sailing. An oil consumption amount corresponding to a predetermined distance (such as 100 nautical miles) may be calculated based on an increasingly stable ship speed under each instantaneous oil supply amount (as after the ship changes the instantaneous oil supply amount, there is a time delay before the changed ship speed is stable, and the ship speed can hardly stay at an accurate value during sailing, the changed ship speed can only be an increasingly stable ship speed). In this way, after trying several instantaneous oil supply amounts, the minimum instantaneous oil supply amount corresponding to the predetermined distance may be found. Of course, in this embodiment, the instantaneous oil supply amount of the main engine of the ship may be changed for once after one period (which is usually 15 minutes), so that the changed instantaneous oil supply amount can be reflected by the changed ship speed. Using such a solution, the optimal preset instantaneous oil supply amount can be found smartly.

Of course, before the instantaneous oil supply amount of the main engine of the ship is gradually changed, the ship may sail under the minimum preset instantaneous oil supply amount calculated based on the above solution.

Further, usually a ship has a safe operation range. An excessively low rotational speed of the main engine will cause stopping of the main engine, while an excessively high rotational speed of the main engine will cause breaking thereof. In addition, the rotational speed characteristics of a diesel main engine (a rotational speed of the main engine has a cube relation with oil consumption) show that in case of an excessively low rotational speed of the main engine, the air intake rate is low, atomization of fuel is poor, heat loss is large and the oil consumption amount is large; in case of an excessively high rotational speed of the main engine, the mechanical loss is large, and the oil consumption amount is large. Therefore, the oil consumption amount correspondingly increases either in case of an excessively high or an excessively low rotational speed of the main engine, and there is an ideal economical rotational speed of the main engine in the rotational speed range thereof.

To prevent the operation of the main engine of the ship from exceeding the safe range due to changes of the instantaneous oil supply amount or to ensure the main engine of the ship to operate within an economical rotational speed range, the configuring module 100 is configured to configure an upper limit value and a lower limit value of the rotational speed of the main engine, such that the main engine of the ship is controlled to operate between the upper and lower limit values by controlling the opening degree of the throttle. In other words, there is a range for the changing instantaneous oil supply amount. The instantaneous oil supply amount cannot be larger than the instantaneous oil supply amount corresponding to the upper limit value of the rotational speed of the main engine, or lower than the instantaneous oil supply amount corresponding to the lower limit value of the rotational speed of the main engine, so that the main engine can operate safely and/or economically.

When the device for controlling energy-saving sailing of a ship corresponds to the second embodiment, the device comprises:

a detecting module 400 configured to detect the resistance suffered by the ship during sailing in real time;

a calculating module 300 configured to judge if the resistance suffered by the ship during sailing changes; and a controlling module 200 configured to control the current opening degree of a throttle to increase the instantaneous oil supply amount of a main engine of the ship if the resistance suffered by the ship becomes smaller; and control the current opening degree of the throttle to reduce the instantaneous oil supply amount of the main engine of the ship if the resistance suffered by the ship becomes larger, during routine sailing.

Compared with the first embodiment, this embodiment can adjust the operating parameters of the main engine of the ship more actively, the response speed of the ship to resistance change can be improved, and better oil-saving effect can be achieved for the sailing of the ship.

Further, the resistance change of the ship during sailing may be judged by various ways, such as using a sensor or using the following solutions.

The detecting module 400 is configured to acquire a ship speed relative to the ground and a ship speed relative to water in real time. The calculating module 300 is configured to judge if a resistance suffered by the ship changes according to the ship speed relative to the ground and the ship speed relative to water. Theoretically, if seawater is still seawater and wind is calm wind, the ship speed relative to the ground should be the same as the ship speed relative to water. However, when seawater flows and/or wind blows, the ship speed relative to the ground will be different from the ship speed relative to water: when the ship sails downstream (including the combined influence of water flow and wind), the ship speed relative to water is smaller than the ship speed relative to the ground; and when the ship sails upstream, the ship speed relative to the ground is smaller than the ship speed relative to water. The ship speed relative to the ground may be acquired by GPS devices or the like, and the ship speed relative to water may be acquired by a corresponding sensor assembled on the ship. It can be understood that, under the same instantaneous oil supply amount, when the ship speed relative to the ground and the ship speed relative to water change or a difference therebetween changes, the resistance suffered by the ship changes.

The detecting module 400 is further configured to acquire the ship speed relative to the ground in real time. The calculating module 300 is configured to judge that the resistance suffered by the ship changes if the ship speed relative to the ground changes. Referring to the above description, it can be understood that the ship speed relative to the ground should remain constant under the same instantaneous oil supply amount, and the resistance suffered by the ship changes if the ship speed relative to the ground changes. It is worthy of being noted that the technical solution in this embodiment is a dynamic control solution actively fed back by the ship according to external conditions. It can be understood that, after the resistance suffered by the ship changes, if the resistance suffered by the ship changes relative to the changed resistance is continuously judged; and if so, operating parameters of the ship are correspondingly adjusted. As such, the instantaneous oil supply amount of the main engine of the ship may be adjusted continually and actively according to changes of external conditions to optimize the oil consumption amount of the ship.

Further, in this embodiment, the instantaneous oil supply amount may be increased or decreased properly according to the sailing experience, and the changed instantaneous oil supply amount may also be calculated through the controlling module 200.

Further, in this embodiment, the controlling module 200 is configured to:

if the resistance suffered by the ship becomes smaller, gradually increase the instantaneous oil supply amount of the main engine of the ship, calculate an oil consumption amount corresponding to a predetermined distance under each instantaneous oil supply amount in real time to identify the minimum instantaneous oil supply amount for the predetermined distance, and keep sailing under the minimum instantaneous oil supply amount until the resistance suffered by the ship changes; and if the resistance suffered by the ship becomes larger, gradually reduce the instantaneous oil supply amount of the main engine of the ship, calculate an oil consumption amount corresponding to the predetermined distance under each instantaneous oil supply amount in real time to identify the minimum instantaneous oil supply amount for the predetermined distance, and keep sailing under the minimum instantaneous oil supply amount until the resistance suffered by the ship changes.

In this solution, an oil consumption amount corresponding to a predetermined distance (such as 100 nautical miles) may be calculated based on an increasingly stable ship speed under each instantaneous oil supply amount (as after the ship changes the instantaneous oil supply amount, there is a time delay before the changed ship speed is stable, and the ship speed can hardly stay at an accurate value during sailing, the changed ship speed can only be an increasingly stable ship speed). In this way, after trying several instantaneous oil supply amounts, the minimum instantaneous oil supply amount corresponding to the predetermined distance may be found. Of course, in this embodiment, the instantaneous oil supply amount of the main engine of the ship may be changed for once after one period (which is usually 15 minutes), so that the changed instantaneous oil supply amount can be reflected by the changed ship speed. Using such a solution, the optimal preset instantaneous oil supply amount can be found smartly.

Further, usually a ship has a safe operation range. An excessively low rotational speed of the main engine will cause stopping of the main engine, while an excessively high rotational speed of the main engine will cause breaking thereof. In addition, the rotational speed characteristics of a diesel main engine (a rotational speed of the main engine has a cube relation with oil consumption) show that in case of an excessively low rotational speed of the main engine, the air intake rate is low, atomization of fuel is poor, heat loss is large and the oil consumption amount is large; and in case of an excessively high rotational speed of the main engine, the mechanical loss is large, and the oil consumption amount is large. Therefore, the oil consumption amount increases either in case of an excessively high or an excessively low rotational speed of the main engine, and there is an ideal economical rotational speed of the main engine in the rotational speed range thereof.

To prevent the operation of the main engine of the ship from exceeding the safe range due to changes of the instantaneous oil supply amount or to ensure the main engine of the ship to operate within an economical rotational speed range, the device further comprises a configuring module 100. The configuring module 100 is configured to configure an upper limit value and a lower limit value of the rotational speed of the main engine of the ship, such that the main engine of the ship is controlled to operate between the upper and lower limit values by controlling the opening degree of the throttle. In other words, there is a range for the changing instantaneous oil supply amount. The instantaneous oil supply amount cannot be larger than the instantaneous oil supply amount corresponding to the upper limit value of the rotational speed of the main engine, or lower than the instantaneous oil supply amount corresponding to the lower limit value of the rotational speed of the main engine, so that the main engine of the ship can operate safely and/or economically.

Further, in this embodiment, the configuring module 100 is configured to configure a preset instantaneous oil supply amount in advance prior to actively feeding back and controlling the operating parameters of the ship. The controlling module 200 is configured to, during routine sailing, keep the main engine of the ship to operate under the preset instantaneous oil supply amount by controlling the opening degree of the throttle until the resistance suffered by the ship changes.

Further, in this embodiment, the preset instantaneous oil supply amount can be set according to the sailing experience or through the calculating module 300.

The calculating module 300 is configured to: calculate the lowest allowable sailing speed based on the sailing distance and the maximum allowable sailing time; and calculate the required instantaneous oil supply amount of the main engine based on the lowest allowable sailing speed and the load of the ship when sailing in still water, and take the same as the preset instantaneous oil supply amount of the main engine. Usually, the sailing time from a starting point to a destination is a range allowing fluctuations. For example, the sailing time from Changshu harbor to Qinhuangdao harbor may be between 50 and 55 hours, so the maximum allowable sailing time is 55 hours. In this way, the lowest allowable sailing speed can be calculated based on the sailing distance and the maximum allowable sailing time. As mentioned above, a ship during sailing on the sea cannot always sail upstream or downstream. Therefore, the load of the main engine for sailing in still water is used as a reference for calculations of the preset instantaneous oil supply amount. In this embodiment, as the maximum allowable sailing time is used, the minimum preset instantaneous oil supply amount can be found.

The calculating module 300 may also be matched with the controlling module 200. The controlling module 200 is configured to gradually change the instantaneous oil supply amount of the main engine of the ship. The calculating module 300 is configured to calculate an oil consumption amount corresponding to a predetermined distance under each instantaneous oil supply amount; and calculate the minimum instantaneous oil supply amount corresponding to the predetermined distance, and take the same as the preset instantaneous oil supply amount. In this solution, the instantaneous oil supply amount of the main engine of the ship may be gradually changed after the ship starts sailing or after the ship enters routine sailing. An oil consumption amount corresponding to a predetermined distance (such as 100 nautical miles) may be calculated based on an increasingly stable ship speed under each instantaneous oil supply amount (as after the ship changes the instantaneous oil supply amount, there is a time delay before the changed ship speed is stable, and the ship speed can hardly stay at an accurate value during sailing, the changed ship speed can only be an increasingly stable ship speed). In this way, after trying several instantaneous oil supply amounts, the minimum instantaneous oil supply amount corresponding to the predetermined distance may be found. Of course, in this embodiment, the instantaneous oil supply amount of the main engine of the ship may be changed for once after one period (which is usually 15 minutes), so that the changed instantaneous oil supply amount can be reflected by the changed ship speed. Using such a solution, the optimal preset instantaneous oil supply amount can be found smartly.

Of course, before the instantaneous oil supply amount of the main engine of the ship is gradually changed, the ship may sail under the minimum preset instantaneous oil supply amount calculated based on the above solution.

When corresponding to the third embodiment, the device for controlling energy-saving sailing of a ship differs from the second embodiment in that: in this embodiment, the calculating module 300 is configured to judge if the resistance suffered by the ship during sailing changes, and if the resistance change is not less than a preset threshold. The controlling module 200 correspondingly changes the operating parameters of the ship as long as the change amount of a resistance suffered by the ship is not less than the preset threshold. This is because the need to frequently change the operating parameters (such as the instantaneous oil supply amount) of the ship. This is because it needs to frequently change the operating parameters (such as the instantaneous oil supply amount) of the ship if the resistance suffered by the ship during sailing frequently changes, which is not favorable for energy-saving.

Therefore, in this embodiment, it is necessary for the configuring module 100 to configure a preset threshold in advance. In this way, the instantaneous oil supply amount of the main engine of the ship may correspondingly change as long as the change amount of the resistance suffered by the ship is not less than the preset threshold, thereby being more favorable for energy-saving of the ship.

Further, the resistance change may be calculated using a sensor, or according to a relative relation between the ship speed relative to the ground and the ship speed relative to water, and/or according to the resistance condition reflected by the change of the ship speed relative to the ground.

When corresponding to the fourth embodiment, the device for controlling energy-saving sailing of a ship differs from the second embodiment in that: the detecting module 400 is configured to detect the ship speed relative to the ground and the ship speed relative to water to judge the current resistance suffered by the ship; that is, it only judges if the ship sails downstream or upstream currently.

Meanwhile, the calculating module 300 is further configured to calculate a difference between the ship speed relative to ground and the ship speed relative to water to judge if the controlling module 200 needs to change the instantaneous oil supply amount of the main engine of the ship. The controlling module is configured to:

control the current opening degree of a throttle to increase the instantaneous oil supply amount of the main engine of the ship if the ship speed relative to the ground is larger than the ship speed relative to water and a difference therebetween is not less than a preset value; and control the current opening degree of the throttle to reduce the instantaneous oil supply amount of the main engine of the ship if the ship speed relative to the ground is smaller than the ship speed relative to water and the difference therebetween is not less than the preset value.

Generally, if the difference between the ship speed relative to the ground and the ship speed relative to water is not less than 0.5 knot (unit of sailing speed), the instantaneous oil supply amount of the ship is adjusted by controlling the opening degree of the throttle.

When corresponding to the fifth embodiment, the device for controlling energy-saving sailing of a ship differs from the third embodiment in that: the detecting module 400 may only detect the ship speed relative to the ground to judge the current resistance suffered by the ship according to the ship speed relative to the ground; that is, it only judges if the ship sails downstream or upstream currently.

The calculating module 300 is configured to calculate the change amount of the ship speed relative to ground to judge if the controlling module 200 needs to change the instantaneous oil supply amount of the main engine of the ship. The controlling module 200 is configured to:

if the ship speed relative to the ground becomes larger and the change amount is not less than a preset value, control the current opening degree of the throttle to increase the instantaneous oil supply amount of the main engine of the ship; and if the ship speed relative to the ground becomes smaller and the change amount is not less than a preset value, control the current opening degree of the throttle to reduce the instantaneous oil supply amount of the main engine of the ship.

Generally, if the change amount of the ship speed relative to the ground is not less than 0.5 knot (unit of sailing speed), the instantaneous oil supply amount of the ship is adjusted by controlling the opening degree of the throttle.

When corresponding to the sixth embodiment, the device for controlling energy-saving sailing of a ship, relative to the above embodiment, focuses on determining an optimal instantaneous oil supply amount in an optimizing manner and keeping sailing under the calculated optimal instantaneous oil supply amount to optimize the oil consumption of the ship during sailing. The device comprises:

a controlling module 200 configured to gradually change the instantaneous oil supply amount of a main engine of the ship; and a calculating module 300 configured to calculate an oil consumption amount corresponding to a predetermined distance under each instantaneous oil supply amount; and calculate the minimum instantaneous oil supply amount corresponding to the predetermined distance, and keep sailing under the minimum instantaneous oil supply amount.

In this embodiment, the instantaneous oil supply amount of the main engine of the ship may be gradually changed after the ship starts sailing or after the ship enters routine sailing. An oil consumption amount corresponding to a predetermined distance (such as 100 nautical miles) may be calculated based on an increasingly stable ship speed under each instantaneous oil supply amount (as after the ship changes the instantaneous oil supply amount, there is a time delay before the changed ship speed is stable, and the ship speed can hardly stay at an accurate value during sailing, the changed ship speed can only be an increasingly stable ship speed). In this way, after trying several instantaneous oil supply amounts, the minimum instantaneous oil supply amount corresponding to the predetermined distance may be found. Of course, in this embodiment, the instantaneous oil supply amount of the main engine of the ship may be changed for once after one period (which is usually 15 minutes), so that the changed instantaneous oil supply amount can be reflected by the changed ship speed. Using such a solution, the optimal preset instantaneous oil supply amount suitable for the ship can be found smartly.

Further, usually a main engine of a ship has a safe operation range. An excessively low rotational speed of the main engine will cause stopping of the main engine, while an excessively high rotational speed of the main engine will cause breaking thereof. In addition, the rotational speed characteristics of a diesel main engine (a rotational speed of the main engine has a cube relation with oil consumption amount) show that in case of an excessively low rotational speed of the main engine, the air intake rate is low, atomization of fuel is poor, heat loss is large and the oil consumption amount is large; and in case of an excessively high rotational speed of the main engine, the mechanical loss is large, and the oil consumption amount is large. Therefore, the oil consumption amount correspondingly increases either in case of an excessively high or an excessively low rotational speed of the main engine, and there is an ideal economical rotational speed of the main engine in the rotational speed range thereof.

To prevent the operation of the main engine of the ship from exceeding the safe range due to changes of the instantaneous oil supply amount or to ensure the main engine of the ship to operate within an economical rotational speed range, the device further comprises a configuring module 100. The configuring module 100 is configured to configure an upper limit value and a lower limit value of the rotational speed of the main engine of the ship, such that the main engine of the ship is controlled to operate between the upper and lower limit values by controlling the opening degree of the throttle. In other words, there is a range for the changing instantaneous oil supply amount. The instantaneous oil supply amount cannot be larger than the instantaneous oil supply amount corresponding to the upper limit value of the rotational speed of the main engine of the ship, or lower than the instantaneous oil supply amount corresponding to the lower limit value of the rotational speed of the main engine of the ship, so that the main engine of the ship can operate safely and/or economically.

Further, the device further comprises a detecting module 400. The specific functions of the detecting module 400, the calculating module 300 and The detecting module 400, the calculating module 300 and the controlling module 200 can synergistically judge if the instantaneous oil supply amount of the main engine of the ship needs to be adjusted properly (see the above embodiments for details), which will not be repeated herein.

Figure 10:
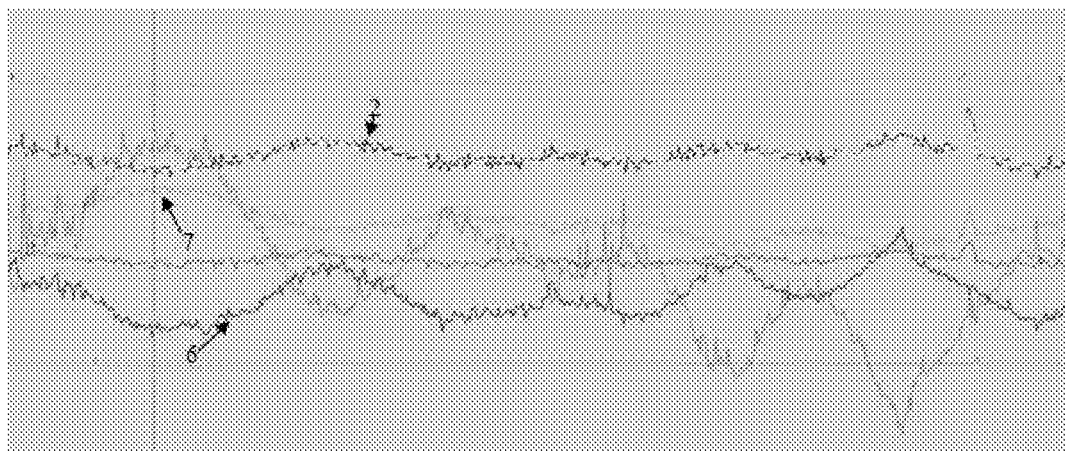
FIG. 10 shows an actual sailing path of a ship using a method and device for controlling energy-saving sailing of the ship according to the present invention.

As shown in FIG. 10, the oil-saving effect of the method and device for controlling energy-saving sailing of a ship of this invention will be understood more easily by illustrating according to the sailing tendency chart collected within a period of time in actual sailing of the ship. In the tendency chart, the method and device for controlling energy-saving sailing of a ship judge the resistance suffered by the ship based on the relation between the ship speed relative to the ground and the ship speed relative to water, which is merely an example for proving the oil-saving effect brought by the method and device for controlling energy-saving sailing of a ship of this invention. Compared with a traditional sailing manner with a fixed rotational speed or fixed power of the main engine of the ship, various embodiments above promote the oil-saving effect of the ship during sailing in varying levels.

The 6th line in FIG. 10 is a curve of a difference between the ship speed relative to the ground and the ship speed relative to water. A downwardly concave part of the curve refers to a state under which the resistance suffered by the ship increases (when sailing upstream), and an upwardly convex part thereof refers to a state under which the resistance suffered by the ship decreases (when sailing downstream).

The 2nd line in FIG. 10 represents the instantaneous oil supply amount of the main engine of the ship. It can be seen that, when the resistance suffered by the ship increases, the instantaneous oil supply amount of the main engine of the ship may correspondingly decreases, and when the resistance suffered by the ship decreases, the instantaneous oil supply amount of the main engine of the ship correspondingly increases. However, in the middle of FIG. 10, although the resistance suffered by the ship continually increases, the instantaneous oil supply amount of the main engine of the ship is kept at a relatively stable state, which means that the rotational speed of the main engine of the ship has reached a preset lower limit value and the instantaneous oil supply amount of the main engine of the ship cannot decrease continually. See the tail part of FIG. 10, the 2nd line raises sharply, which means sudden increase of the instantaneous oil supply amount caused by artificially playing a rudder.

By comparing with the 7th line which represents the oil consumption amount of the ship per 100 nautical miles in FIG. 10, it can be obviously seen that, although the oil consumption amount of the ship per 100 nautical miles increases (this is the inevitable result) relative to that under the smaller resistance when the resistance suffered by the ship increases, as observed from the overall curve, the oil consumption amount of the ship per 100 nautical miles tends to decrease. Meanwhile, it can also be seen that, when the resistance suffered by the ship increases or decreases, the instantaneous oil supply amount suitable for the current resistance suffered by the ship can be found smartly by calculating the minimum instantaneous oil supply amount for the predetermined distance, and the oil consumption amount of the ship during sailing is saved to a greater extent.

As can be seen from the above calculation results and the actually recorded ship index curve, the oil consumption amount can be greatly reduced under the same sailing distance.

The above embodiment focuses on the influence of external conditions (such as wind flow and water flow) during ship operating on the ship in view of the sailing efficiency of the ship and the research on the occurrence mechanism of wind flow and water flow to the resistance suffered by the ship during sailing, such that the oil consumption amount of the ship during sailing is correspondingly reduced.

Especially, the control method corresponding to the second to the fifth embodiments of this invention and the control device corresponding to the second to the fifth embodiments can adapt to constantly changing wind flow and water flow by continually adjusting the sailing parameters and states of the ship, such that the oil consumption amount is further reduced.

Upon practices, the method and device for controlling energy-saving sailing of a ship of this invention have the following advantages.

1. Under certain sea conditions, by adopting the method and device for controlling energy-saving sailing of a ship, the fuel consumption of the ship sailing within a certain route (1,000 nautical miles) is averagely reduced by 5% to 10% than that of the existing manner, and the oil-saving effect will be improved with the increase of the sailing distance.

2. If two ships of the same type sail according to the same route within a certain sea area, in case of not prolonging the sailing time, oil of the ship adopting the method and device for controlling energy-saving sailing of a ship may be averagely reduced by about 5% to 8%.

3. In case of a one-year period, the ship adopting the method and device for controlling energy-saving sailing of a ship can reach the minimum oil consumption value (per day) among the same type of ships within the same operating time of a main engine.

4. Within a certain period of time, the minimum oil consumption value for a single trip within the same type of ships may be created by adopting the method and device for controlling energy-saving sailing of a ship.

5. The method and device for controlling energy-saving sailing of a ship of this invention may perform real-time monitoring on operating equipment and system of the ship and improve the equipment management level.

6. The method and device for controlling energy-saving sailing of a ship can implement monitoring and management of fuel of the ship, and can monitor and accurately calculate the instantaneous oil supply amount.

By taking coal transportation from the north to the south of China as an example, in 2013, the launched displacements of ships in Qinhuangdao harbor, Tangshan harbor and Huanghua harbor are 238,270,000 tons, 186,460,000 tons and 171,000,000 tons respectively, totally 595,730,000 tons. Representative ships for coastal transportation in China are 35,000-ton seagoing vessels with annually averaged transportation volume of 700,000 tons, and 850 seagoing vessels are needed in total. As calculated at about 3,500 tons of annual oil consumption of each ship in the current year, 175-350 tons of oil can be reduced for the ship adopting the method and device for controlling energy-saving sailing of a ship annually, if the fuel-saving amount is calculated to be 5% to 10%. 148,750-297,500 tons of oil can be reduced for 850 ships annually. As calculated at the price of RMB 4,300 per ton of fuel, the fuel cost can be saved by RMB 0.6396-1.2792 billion annually. There are about 2,500 ships for coastal transportation in China, and the fuel cost can be saved by RMB 1.881-3.612 billion annually.

In addition, the emissions of carbon dioxide are correspondingly reduced because of the decreased consumption of fuel. As calculated on the basis that 3.5 tons of carbon dioxide is discharged every ton of heavy oil, 520,600-1,041,200 tons of carbon dioxide can be reduced for 850 ships for coal transportation, which adopt the method and the device of this invention. There are about 2,500 ships for coastal transportation in China, and 1,531,200-2940,000 tons of carbon dioxide can be reduced annually. Meanwhile, the emissions of many other substances (such as sulfur dioxide) can be reduced.

Although multiple embodiments of this invention have been illustrated and described in detail, those skilled in the art may make various modifications and variations to the invention based on the content disclosed by this invention or the content derived therefrom without departing from the spirit and scope of the invention. Thus, the scope of this invention should be understood and deemed to include these and other modifications and variations.

What is claimed is:

1. A method for controlling energy-saving sailing of a ship, comprising:
   detecting a ship speed relative to the ground and a ship speed relative to water in real time during routine sailing;
   controlling the current opening degree of a throttle to increase the instantaneous oil supply amount of a main engine of the ship if the ship speed relative to the ground is larger than the ship speed relative to water and a difference therebetween is not less than a preset value; and
   controlling the current opening degree of the throttle to reduce the instantaneous oil supply amount of the main engine of the ship if the ship speed relative to the ground is smaller than the ship speed relative to water and the difference therebetween is not less than the preset value;
   if the ship speed relative to the ground is larger than the ship speed relative to water, gradually increasing the instantaneous oil supply amount of the main engine of the ship, calculating an oil consumption amount corresponding to a predetermined distance under each instantaneous oil supply amount in real time to identify the minimum instantaneous oil supply amount for the predetermined distance, and keeping sailing under the minimum instantaneous oil supply amount;
   if the ship speed relative to the ground is smaller than the ship speed relative to water, gradually reducing the instantaneous oil supply amount of the main engine of the ship, calculating an oil consumption amount corresponding to the predetermined distance under each instantaneous oil supply amount in real time to identify the minimum instantaneous oil supply amount for the predetermined distance, and keeping sailing under the minimum instantaneous oil supply amount; and
   repeating the above steps.

2. The method according to claim 1, wherein an upper limit value and a lower limit value of a rotational speed of the main engine are configured, such that the main engine is controlled to operate between the upper and lower limit values by controlling the opening degree of the throttle.

3. The method according to claim 2, wherein, before detecting the ship speed relative to the ground and the ship speed relative to water in real time during routine sailing, the method further comprises:

configuring a preset instantaneous oil supply amount; and keeping the main engine of the ship operating below the preset instantaneous oil supply amount by controlling the opening degree of the throttle during routine sailing, until the difference between the ship speed relative to the ground and the ship speed relative to water is not less than the preset value.

4. The method according to claim 3, further comprising:

gradually changing the instantaneous oil supply amount of the main engine of the ship, and calculating an oil consumption amount corresponding to the predetermined distance under each instantaneous oil supply amount; and calculating the minimum instantaneous oil supply amount corresponding to the predetermined distance, and taking the same as the preset instantaneous oil supply amount.

5. A method for controlling energy-saving sailing of a ship, comprising:

detecting a ship speed relative to the ground in real time;

during routine sailing and under the same instantaneous oil supply amount;

if the ship speed relative to the ground becomes larger and a change amount is not less than a preset value, controlling the current opening degree of a throttle to increase the instantaneous oil supply amount of a main engine of the ship; and if the ship speed relative to the ground becomes smaller and the change amount is not less than a preset value, controlling the current opening degree of the throttle to reduce the instantaneous oil supply amount of the main engine of the ship;

if the ship speed relative to the ground becomes larger and the change amount is not less than a preset value, gradually increasing the instantaneous oil supply amount of the main engine of the ship, calculating an oil consumption amount corresponding to a predetermined distance under each instantaneous oil supply amount in real time to identify the minimum instantaneous oil supply amount for the predetermined distance, and keeping sailing under the minimum instantaneous oil supply amount;

if the ship speed relative to the ground becomes smaller and the change amount is not less than a preset value, gradually reducing the instantaneous oil supply amount of the main engine of the ship, calculating an oil consumption amount corresponding to the predetermined distance under each instantaneous oil supply amount in real time to identify the minimum instantaneous oil supply amount for the predetermined distance, and keeping sailing under the minimum instantaneous oil supply amount; and repeating the above steps.

6. The method according to claim 5, wherein an upper limit value and a lower limit value of a rotational speed of the main engine are configured, such that the main engine is controlled to operate between the upper and lower limit values by controlling the opening degree of the throttle.

7. The method according to claim 5, wherein, before detecting the ship speed relative to the ground in real time, the method further comprises:

configuring a preset instantaneous oil supply amount; and keeping the main engine of the ship operating below the preset instantaneous oil supply amount by controlling the opening degree of the throttle during routine sailing, until the ship speed relative to the ground changes and the change amount is not less than the preset value.

8. The method according to claim 7, further comprising:

gradually changing the instantaneous oil supply amount of the main engine of the ship, and calculating an oil consumption amount corresponding to the predetermined distance under each instantaneous oil supply amount; and calculating the minimum instantaneous oil supply amount corresponding to the predetermined distance, and taking the same as the preset instantaneous oil supply amount.

9. A device for controlling energy-saving sailing of a ship, comprising:

a detecting module configured to detect a ship speed relative to the ground and a ship speed relative to water in real time;

a calculating module configured to calculate a difference between the ship speed relative to the ground and the ship speed relative to water; and a controlling module configured to control the current opening degree of a throttle to increase the instantaneous oil supply amount of a main engine of the ship if the ship speed relative to the ground is larger than the ship speed relative to water and the difference is not less than a preset value, and control the current opening degree of the throttle to reduce the instantaneous oil supply amount of the main engine of the ship if the ship speed relative to the ground is smaller than the ship speed relative to water and the difference is not less than the preset value, during routine sailing;

wherein the controlling module is further configured to:

if the ship speed relative to the ground is larger than the ship speed relative to water, gradually increase the instantaneous oil supply amount of the main engine of the ship, calculate an oil consumption amount corresponding to a predetermined distance under each instantaneous oil supply amount in real time to identify the minimum instantaneous oil supply amount for the predetermined distance, and keep sailing under the minimum instantaneous oil supply amount and if the ship speed relative to the ground is smaller than the ship speed relative to water, gradually reduce the instantaneous oil supply amount of the main engine of the ship, calculate an oil consumption amount corresponding to the predetermined distance under each instantaneous oil supply amount in real time to identify the minimum instantaneous oil supply amount for the predetermined distance, and keep sailing under the minimum instantaneous oil supply amount.

10. The device according to claim 9, further comprising:

a configuring module to configure an upper limit value and a lower limit value of a rotational speed of the main engine, such that the main engine is controlled to operate between the upper and lower limit values by controlling the opening degree of the throttle.

11. The device according to claim 9, further comprising:

a configuring module to configure a preset instantaneous oil supply amount; and the controlling module is further configured to keep the main engine of the ship to operate below the preset instantaneous oil supply amount by controlling the opening degree of the throttle during routine sailing, until the difference between the ship speed relative to the ground and the ship speed relative to water is not less than the preset value.

12. The device according to claim 11, wherein the controlling module is further configured to gradually change the instantaneous oil supply amount of the main engine of the ship; and the calculating module is further configured to calculate an oil consumption amount corresponding to the predetermined distance under each instantaneous oil supply amount, and calculate the minimum instantaneous oil supply amount corresponding to the predetermined distance, and take the same as the preset instantaneous oil supply amount.

13. A device for controlling energy-saving sailing of a ship, comprising:

a detecting module configured to detect a ship speed relative to the ground in real time;

a calculating module configured to judge if a change amount of the ship speed relative to the ground is not less than a preset value under the same instantaneous oil supply amount; and a controlling module configured to, if the ship speed relative to the ground becomes larger and the change amount is not less than the preset value during routine sailing, control the current opening degree of a throttle to increase the instantaneous oil supply amount of a main engine of the ship; and if the ship speed relative to the ground becomes smaller and the change amount is not less than the preset value during routine sailing, control the current opening degree of the throttle to reduce the instantaneous oil supply amount of the main engine of the ship;

wherein the controlling module is further configured to:

if the ship speed relative to the ground becomes larger and the change amount is not less than a preset value, gradually increase the instantaneous oil supply amount of the main engine of the ship, calculate an oil consumption amount corresponding to a predetermined distance under each instantaneous oil supply amount in real time to identify the minimum instantaneous oil supply amount for the predetermined distance, and keep sailing under the minimum instantaneous oil supply amount; and if the ship speed relative to the ground becomes smaller and the change amount is not less than a preset value, gradually reduce the instantaneous oil supply amount of the main engine of the ship, calculate an oil consumption amount corresponding to the predetermined distance under each instantaneous oil supply amount in real time to identify the minimum instantaneous oil supply amount for the predetermined distance, and keep sailing under the minimum instantaneous oil supply amount.

14. The device according to claim 13, further comprising:

a configuring module to configure an upper limit value and a lower limit value of a rotational speed of the main engine, such that the main engine is controlled to operate between the upper and lower limit values by controlling the opening degree of the throttle.

15. The device according to claim 13, further comprising:

a configuring module to configure a preset instantaneous oil supply amount; and the controlling module is further configured to keep the main engine of the ship to operate below the preset instantaneous oil supply amount by controlling the opening degree of the throttle during routine sailing, until the ship speed relative to the ground changes and the change amount is not less than the preset value.

16. The device according to claim 15, wherein the controlling module is further configured to gradually change the instantaneous oil supply amount of the main engine of the ship; and the calculating module is further configured to calculate an oil consumption amount corresponding to the predetermined distance under each instantaneous oil supply amount, calculate the minimum instantaneous oil supply amount corresponding to the predetermined distance, and take the same as the preset instantaneous oil supply amount.

\* \* \* \* \*